(12) United States Patent
Takekuma et al.

(10) Patent No.: US 6,211,703 B1
(45) Date of Patent: Apr. 3, 2001

(54) SIGNAL TRANSMISSION SYSTEM

(75) Inventors: Toshitsugu Takekuma, Ebina; Akira Yamagiwa, Kanagawa-ken; Takashi Moriyama, Owariasahi; Ryoichi Kurihara, Hadano, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/869,890

(22) Filed: Jun. 5, 1997

(30) Foreign Application Priority Data

Jun. 7, 1996 (JP) .................................................. 8-145431
Feb. 21, 1997 (JP) .................................................. 9-037390

(51) Int. Cl.$^7$ .............................................. H03K 19/003
(52) U.S. Cl. ................................ 326/101; 326/30; 326/93
(58) Field of Search .................................. 327/297, 293, 327/296, 565, 564, 144, 147, 146, 154, 141, 155, 156, 163, 318, 312, 323, 116, 122; 326/93, 30, 101; 333/32, 124, 17.3

(56) References Cited

U.S. PATENT DOCUMENTS

| | | | |
|---|---|---|---|
| 5,013,942 | * | 5/1991 | Nishimura et al. .................. 327/297 |
| 5,029,279 | * | 7/1991 | Sasaki et al. ........................ 326/40 |
| 5,122,691 | * | 6/1992 | Balakrishnan ....................... 326/86 |
| 5,361,277 | * | 11/1994 | Grover ................................. 375/356 |
| 5,467,033 | * | 11/1995 | Yip et al. ............................. 326/93 |
| 5,528,168 | * | 6/1996 | Kleveland ............................ 326/30 |
| 5,663,661 | * | 9/1997 | Dillon et al. ........................ 326/30 |
| 5,767,695 | * | 6/1998 | Takekuma et al. .................. 326/30 |
| 5,821,767 | * | 10/1998 | Osaka et al. ........................ 326/30 |
| 5,864,253 | * | 1/1999 | Katakura et al. .................... 326/96 |
| 5,896,055 | * | 4/1999 | Toyonaga et al. ................... 327/295 |

FOREIGN PATENT DOCUMENTS 7-202947   8/1995 (JP).
7-283836  10/1995 (JP).

OTHER PUBLICATIONS

*VLSI System Design, Fundamentals of Circuits and Packaging*, Maruzen, 1995, pp. 356–360 (in Japanese, no English translation).

* cited by examiner

Primary Examiner—Howard L. Williams
Assistant Examiner—Don Phu Le
(74) *Attorney, Agent, or Firm*—Antonelli, Terry, Stout & Kraus, LLP

(57) ABSTRACT

A signal transmission system includes a first circuit block having a first output circuit for producing a first signal, a plurality of second circuit blocks each including a first receiving circuit for receiving the first signal, and transmission lines connected between the first circuit block and the second circuit blocks, wherein the first circuit block further includes a second output circuit for producing a second signal, and wherein each of the second circuit blocks further includes a second receiving circuit for receiving the second signal, the first receiving circuit latching the first signal in synchronism with the second signal, removing the unsuccessfulness in the signal transmission and reception due to the propagation delay of signals between circuits.

28 Claims, 32 Drawing Sheets

FIG.3
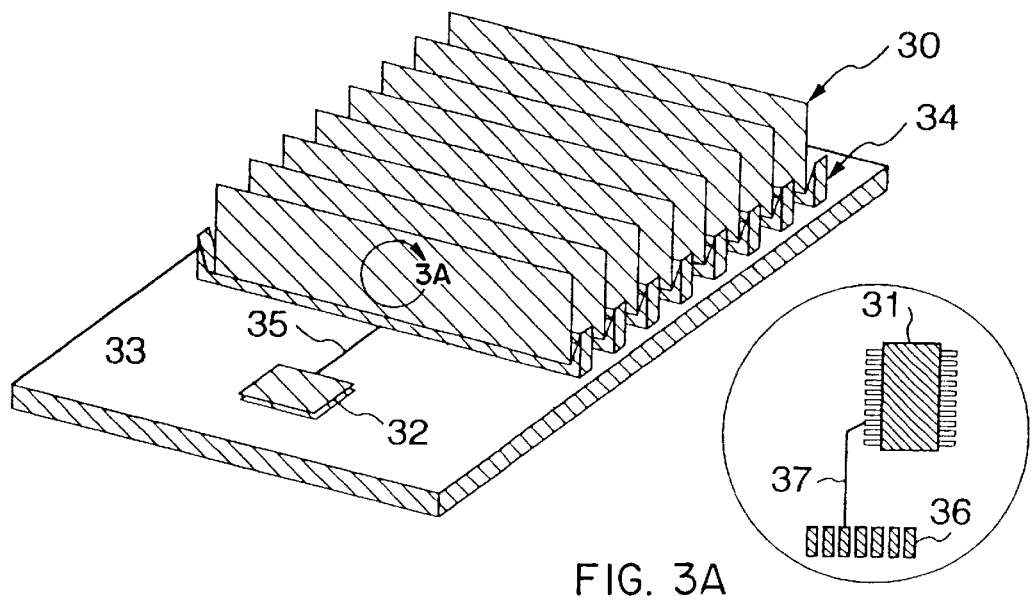
FIG. 3A
FIG.4
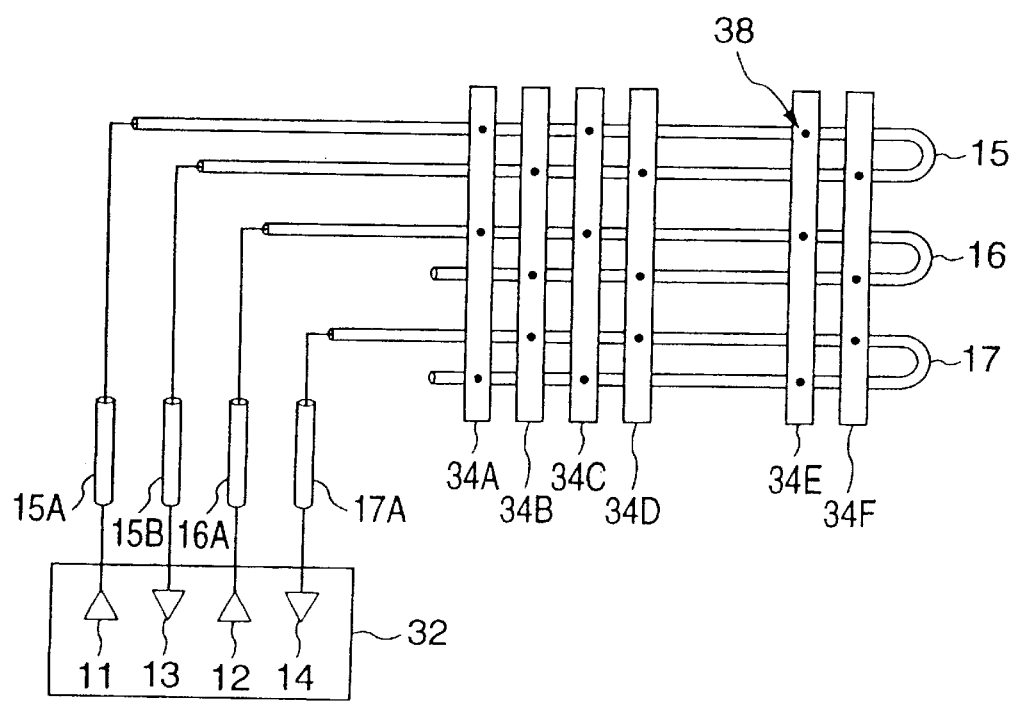

FIG.13
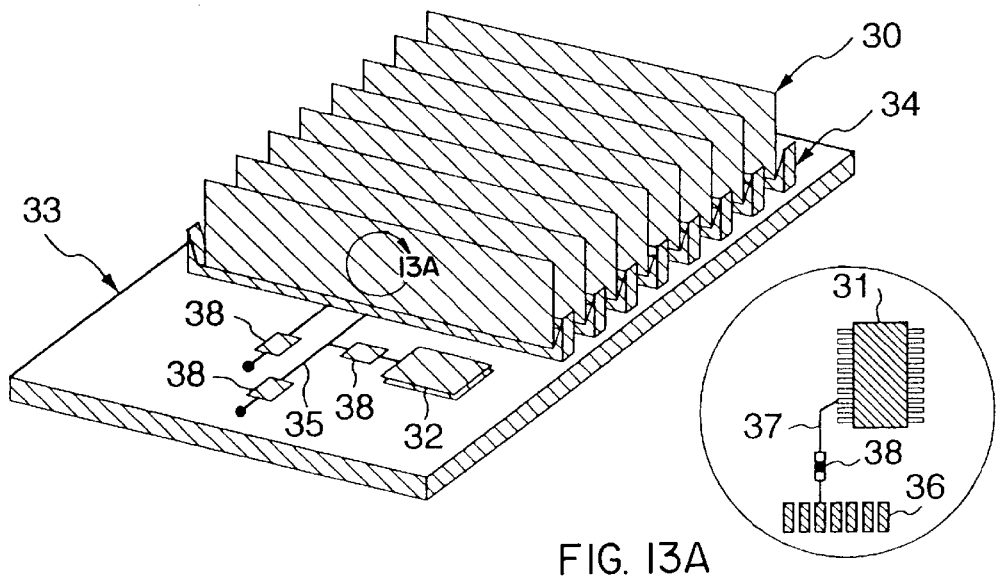
FIG. 13A
FIG.14
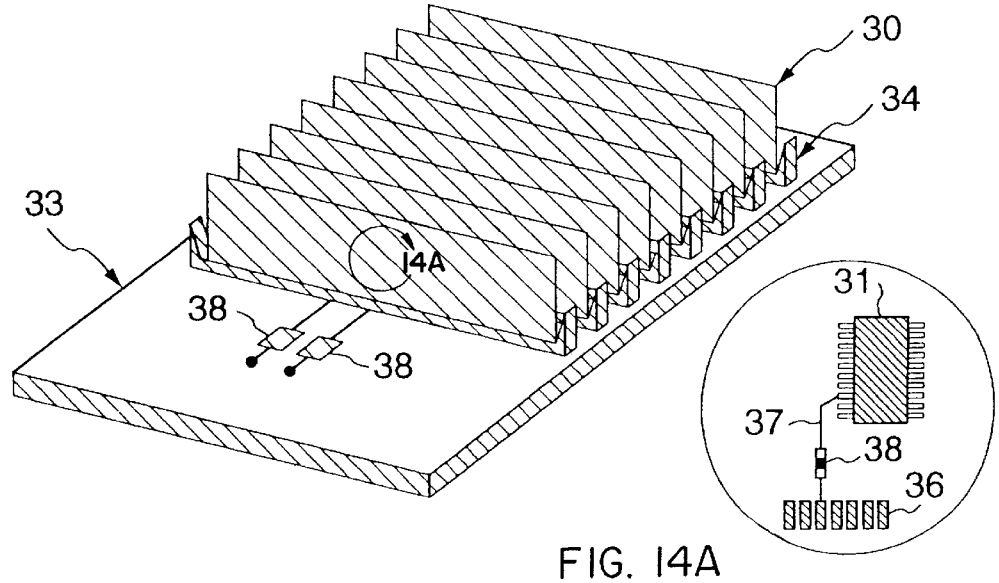
FIG. 14A

SIGNAL TRANSMISSION SYSTEM

CROSS-REFERENCE TO RELATED APPLICATION

The application relates to U.S. patent application Ser. Nos. 08/596,724, 08/596,773 and 08/747,208, filing date of these are Jun. 30, 1994, entitled "SIGNAL TRANSMITTING DEVICE, CIRCUIT BLOCK AND INTEGRATED CIRCUIT SUITED TO FAST SIGNAL TRANSMISSION", by T. Takekuma, et al. and assigned to HITACHI, LTD.; and Ser. No. 08/388,990 filed on Feb. 15, 1995 entitled "SIGNAL TRANSMITTING DEVICE SUITABLE FOR FAST SIGNAL TRANSMISSION", by T. Takekuma, et al. and assigned to the same, disclosure of which are incorporated herein by reference.

BACKGROUND OF THE INVENTION

This invention relates to techniques of signal transmission between components (typically, integrated circuits) mounted within a workstation, personal computer or the like, and particularly to a technique effective for fast signal transmission.

FIG. 3 shows one example of the memory circuits used in a present workstation or personal computer.

In FIG. 3, reference numeral 30 represents memory modules each having a plurality of memory LSIs 31 mounted, and 32 a memory controller for controlling the memory LSIs 31, transmitting data being written to the memory LSIs 31 and receiving read data from the memory LSIs 31.

The memory controller 32 sometimes has separate integrated circuits which are used as a portion for controlling the memory LSIs 31 and as other portions for transmitting the data being written and receiving the read data.

The memory LSIs given above are assumed to be of the clock synchronous type. The clock synchronous type memories are, for example, SDRAMs (Synchronous Dynamic Random Access Memories).

The memory controller 32 is mounted on a mother board 33, and the memory modules 30 are also mounted on the mother board through connectors 34.

Although 8 memory modules are mounted on the mother board as shown in FIG. 3, the number of modules depends on the scale and specification of the system or the object which the user desires to achieve.

The operation of the memory circuits will be described briefly as follows. A control signal and the data signal being written from the memory controller are transmitted through a signal transmission line 35 on the mother board and through the connector 34, and a contact 36 and transmission line 37 on each memory module to the memory LSI 31 on the module. In addition, when the data is read out, the read data from the memory LSI 31 is transmitted trough the transmission line 37 and contact 36 on the module, the connector 34 and the transmission line 35 on the mother board to the memory controller 32.

This transmission line 35 is called memory bus. FIG. 3 shows only one of a plurality of memory buses.

Although the control signal and data signal are supplied to the SDRAMs as described above, a clock signal is fed thereto. The transmission line for the clock is not shown in FIG. 3. The clock transmission line is extended from the clock source directly to the memory controller and the memory LSIs within each memory module or through frequency-dividing circuits or distribution circuits thereto.

Some signal transmission lines between the integrated circuits within such a memory system are constructed by a single-phase clock system using flip-flops.

This technique is described in detail in, for example, "VLSI SYSTEM DESIGN, FUNDAMENTALS OF CIRCUITS AND PACKAGING" (published by Maruzen, 1995), pp. 356–360.

FIG. 2 shows an example of the simplest single-phase clock system, in which an output circuit and an input circuit are connected in one-to-one relation through a transmission line. In FIG. 2, there are shown a circuit block 21 that includes a flip-flop 24 and the output circuit 26, and a circuit block 22 that includes the input circuit 27 and a flip-flop 25. In addition, the transmission line 23 transmits the signal from the circuit block 21 to the circuit block 22.

To the flip-flops 24 and 25 is supplied a clock directly from a clock generator or through distribution or frequency-dividing circuits from the clock generator. Although not shown in FIG. 2, generally the input signal to the flip-flop 24 is produced within the circuit block 21, and the output signal from the flip-flop 25 is supplied to another circuit within the circuit block 22.

In addition, while the input signal to the flip-flop 24 is generated within the circuit block 21 as described above, it is sometimes generated in another circuit block, and fed directly to the flip-flop. Similarly, the output signal from the flip-flop 25 is not necessarily fed to an input circuit within the circuit block 22, but it is sometimes supplied directly to an input circuit within another circuit block.

The basic operation of the circuits shown in FIG. 2 will be described below.

It is assumed that a clock is fed to the flip-flops 24 and 25. The flip-flop 24 produces in synchronism with the clock the data that has been latched at the previous cycle's clock, and transmits it to the input portion of the output circuit 26, the output portion of which permits the data to be transmitted through the transmission line 23. The data on the transmission line 23 is fed through the input circuit 27 to the input portion of the flip-flop 25, where the data is latched in synchronism with the clock.

The single phase clock system design makes the clock of the same phase be supplied to each of the flip-flops. The equalization of the phase of the clock to one flip-flop with that to the other flip-flop is generally made by adjusting the lengths of signal lines from the clock generator or the distribution end or frequency-divider side to the clock input portion of each circuit block or by adjusting the capacitance loads of both transmission lines to the clock signal, thereby making the delay of signal in one wiring conductor equal to that in the other transmission lines.

This single-phase clock system generally employs such a high-efficient transmission method that a signal is transmitted at a cycle and latched on the receiving side at the next cycle. In this method, the cycle time, $t_{cycle}$ is required to satisfy the following condition.

$$t_{cycle} > t_{delay}(max) + t_{pd}(max) + t_{setup}(max) + t_{skew}(max)$$

where the $t_{delay}(max)$ is the clock access time of the circuit block 21, or the time from when the clock is fed to the circuit block 21 to when data is produced from the circuit block 21, the $t_{pd}(max)$ is the propagation time in which the signal produced from the circuit block 21 reaches the circuit block 22, the $t_{setup}(max)$ is the setup time of the circuit block 22, or the time in which the logical value (High or Low level) of a signal to the circuit block 22 must become definite before the clock to the circuit block 22, and the $t_{skew}(max)$ is the clock skew between the clocks to the circuit blocks 21 and 22. The (max) in the above condition indicates the maximum of the associated value considering the dispersion of temperature and process.

In the memory circuits, when the transmission lines between the circuit blocks (the memory controller and memory modules) are relatively long, the propagation time, $t_{pd}$ is large. If the connector pitch is 400 mil (about 1 cm), and if sixteen memory modules are used, the propagation time $t_{pd}$ is 3 to 4 ns.

If the $t_{pd}(\text{max})$ is 4 ns and if the cycle rate is 33 MHz, the ratio of the $t_{pd}$ to the period, 30 ns is only about 0.1, and thus the condition of $t_{cycle} > t_{delay}(\text{max}) + t_{pd}(\text{max}) + t_{setup}(\text{max}) + t_{skew}(\text{max})$ can be satisfied by fast operation of the circuit blocks.

However, if the cycle rate is increased to 250 MHz, the period is equal to the $t_{pd}(\text{max})$, or 4 ns. Thus, even though the circuit blocks are operated at higher speed, this system cannot be realized. Since the $t_{delay}$ (max), $t_{setup}(\text{max})$ and $t_{skew}(\text{max})$ can be decreased by reducing the size of devices, the condition of $t_{cycle} < t_{delay}(\text{max}) + t_{pd}(\text{max}) + t_{setup}(\text{max}) + t_{skew}(\text{max})$ can be actually satisfied even at around 100 MHz, not 200 MHz. Thus, the circuit blocks cannot be operated at a higher cycle rate than 100 MHz from the design point of view.

For faster operation, there is a consideration of ensuring window, that is a signal valid interval, other than the above delay calculation. Although the delay calculation considers whether signal transmission is possible or not under the condition that the phase of clock to the output circuit is made equal to that of the clock to the input circuit, the window consideration enables much higher operation by adding offset adjustment to the clock phase.

The addition of offset adjustment to the clock phase means that, for example in FIG. 3, the phase of the clock to the memory modules is deviated ahead of or behind that of the clock to the memory controller.

If the write delay time is shorter than the read delay time, the cycle rate is determined according to the read delay time under the delay calculation method. In the window consideration case, the phase of the clock to the memory LSI is deviated to proceed, making the read data be fast produced. Consequently, the above result increases the time between the clock edge at the memory LSI and the clock edge at the next cycle to memory controller, thus ensuring a longer time than read delay time. In other words, when the window time assurance is considered, the window time $t_{window}$, or $t_{winodw} = t_{cycle} + t_{OH} - t_{delay}(\text{max})$ is used to design in place of the above condition.

The $t_{OH}$ is the data output hold time in which the output from the output circuit block that is producing an output signal at a clock is switched, after the next clock is fed, to the data (of its cycle). This time is equal to the $t_{delay}(\text{min})$, namely the minimum value of $t_{delay}$ or the above.

Under the estimated value of $t_{window}$, it is necessary to satisfy the following condition. $t_{window} > t_{pd}(\text{max-min}) + t_{setup}(\text{max}) + t_{hold}(\text{max})$ where the $t_{pd}(\text{max-min})$ is the difference between the maximum and minimum of $t_{pd}$. In FIG. 3, the maximum is the propagation time between the memory controller and the farthest module, and the minimum is the propagation time between the memory controller and the nearest module. In other words, the $t_{delay}(\text{max-min})$ indicates the propagation time difference depending on the position of the memory modules.

If the window time is considered for the data writing time and reading time to and from the memory modules, and if the condition of $t_{window} > t_{pd}(\text{max-min}) + t_{setup}(\text{max}) + t_{hold}(\text{max})$ is satisfied, then it is necessary to set up the offset values of the clock phases so that the setup time and hold time can be ensured in the $t_{window} - t_{pd}$ (max-min).

This method enables the operation to be slightly increased, but when the system size, for example, the number of the mounted modules as in FIG. 3 is increased, the $t_{pd}(\text{max-min})$ cannot be neglected, and thus it is still difficult to increase the operation speed.

That is, demand for faster transmission increases the effect of the difference between the propagation time in which the signal from the memory controller is transmitted to the nearest memory module and the propagation time in which the signal from the memory controller is transmitted to the farthest memory module. Consequently, it is difficult to design a memory system for faster operation.

The same problem occurs not only in the memory system but also in the signal transmission between the circuits for transmitting and receiving signals in synchronism with a clock, for example, in the processor bus of a multiprocessor system using a plurality of microprocessors.

SUMMARY OF THE INVENTION

This invention is to solve these problems in the system for transmitting and receiving signals in synchronism with a clock signal.

It is an object of the invention to provide a signal transmission system capable of removing the unsuccessfulness in the signal transmission and reception due to the propagation delay of signals between circuits.

Other objects of the invention will be cleared by the following descriptions.

According to the present invention, to achieve the above objects, there is provided a signal transmission system including a clock output circuit for producing a clock signal, a first circuit block for producing a first signal, a plurality of second circuit blocks for receiving the clock signal, a circuit board having the plurality of second circuit blocks mounted in a row, a first wiring conductor for transmitting the clock signal, and a second transmission line for transmitting signals from the first circuit block to the second circuit blocks, wherein the first transmission line is laid out from the clock output circuit to the plurality of second circuit blocks, and connected thereto in series, and the second transmission line is laid out from the first circuit block to the second circuit blocks, and connected thereto in series, thus the first and second transmission lines being connected to the second circuit blocks.

Therefore, the distance that the clock signal is transmitted from the clock output circuit to an arbitrary one of the second circuit blocks and the distance that the first signal is transmitted from the first circuit block to the second circuit blocks are substantially the same. Thus, when the second circuit blocks latch the first signal in synchronism with the clock signal, it is possible to suppress the effect of the propagation delay of the first signal between the circuits.

In addition, the first and second transmission lines are each laid out from the first circuit block to the farthest one of the second circuit blocks or more distance position, and turned back therefrom, extending back to the nearest one of the second circuit blocks to the first circuit block to form forward and backward transmission line portions, and some of the second circuit blocks are connected to the forward portions of the first and second transmission lines, the remaining second circuit blocks being connected to the backward portions of the first and second transmission lines, thereby reducing the density of the loads.

Moreover, there is provided a signal transmission system including a clock output circuit for producing a clock signal, a first circuit block for producing a first signal and receiving a second signal, a plurality of second circuit blocks for receiving the first signal and producing the second signal, a circuit board having the plurality of second circuit blocks mounted in a row, a first transmission lines for transmitting the clock signal, a second transmission line for transmitting a signal from the first circuit block to the second circuit blocks, and a third transmission line for transmitting a signal from the second circuit blocks to the first circuit block, wherein the first transmission line is laid out from the clock output circuit to the plurality of second circuit blocks, and connected thereto in series, the second and third transmission lines are laid out from the first circuit block to the plurality of second circuit blocks, and connected thereto in series, the second transmission line is laid out from the first circuit block to the farthest one of the second circuit blocks or more distant position, and turned back therefrom, extending back to the nearest one of the second circuit blocks to the first circuit block to form forward and backward transmission line portions, the first and third transmission lines are laid out from the first circuit block to the farthest one of the second circuit blocks or more distant position, turned back therefrom, extending back to the nearest one of the second circuit blocks to the first circuit block, and then reach the first circuit block to form forward and backward transmission line portions, some of the second circuit blocks are connected to the forward portions of the first and second transmission lines, the remaining second circuit blocks being connected to the backward portions of the first and second transmission lines, and the some of the second circuit blocks connected to the forward portion of the first transmission line are connected to the backward portion of the third transmission line, the remaining second circuit blocks being connected to the forward portion of the third transmission line.

Therefore, the relation of the distance that the clock signal is transmitted to an arbitrary one of the second circuit blocks to the distance that the first signal is transmitted from the first output circuit to the second circuit blocks, and the relation of the distance that the second signal produced from the second circuit blocks in synchronism with the clock signal reaches the first circuit block to the distance that the clock signal at which the second circuit blocks produce the second signal reaches the first circuit block are substantially constant independently of the positions of the mounted second circuit blocks. In addition, when the second circuit blocks latch the first signal in synchronism with the clock signal, and when the first circuit block latches the second signal, it is possible to suppress the effect of the propagation delay of first and second signals between the circuits.

Also, there is provided a signal transmission system including a first circuit block that has a first output circuit for producing a first signal, a second output circuit for producing a second signal, a first receiving circuit for receiving a third signal, and a second receiving circuit for receiving a fourth signal, a plurality of second circuit blocks each of which has a third receiving circuit for receiving the first signal, a fourth receiving circuit for receiving the second signal, a third output circuit for producing the third signal, and a fourth output circuit for producing the fourth signal, and first, second, third and fourth transmission line for transmitting first, second, third and fourth signals between the first circuit block and the second circuit blocks, wherein the first, second, third and fourth transmission lines are laid out from the first circuit block to the farthest one of the second circuit blocks or more distance place, and turned back therefrom to form forward and backward conductor portions, some of the second circuit blocks are connected to the forward portions for the first and third signals, the remaining second circuit blocks being connected to the backward transmission line portions, the some of the second circuit blocks connected to the forward portion for the first signal are connected to the backward portions for the second and fourth signals, and the other second circuit blocks are connected to the forward transmission line portions, the second receiving circuit latches the fourth signal in synchronism with the third signal, and the fourth receiving circuit latches the fourth signal in synchronism with the first signal. When the second circuit blocks produce data, the first circuit block may produce a timing signal at which the data is received.

BRIEF DESCRIPTION OF THE DRAWINGS

FIG. 3 shows a conventional memory system having memory modules mounted on a circuit board, and circuits.

FIG. 4 is a diagram for the first embodiment of the invention, showing a connection relation between the memory controller and memory modules, and a pattern of transmission lines.

FIGS. 13, 14, 15 and 16 show examples of the mounting of circuit components of a memory system to which this invention is applied.

DESCRIPTION OF THE PREFERRED EMBODIMENTS

Embodiments of the invention will be described in detail with reference to the accompanying drawings.

Figure 17:
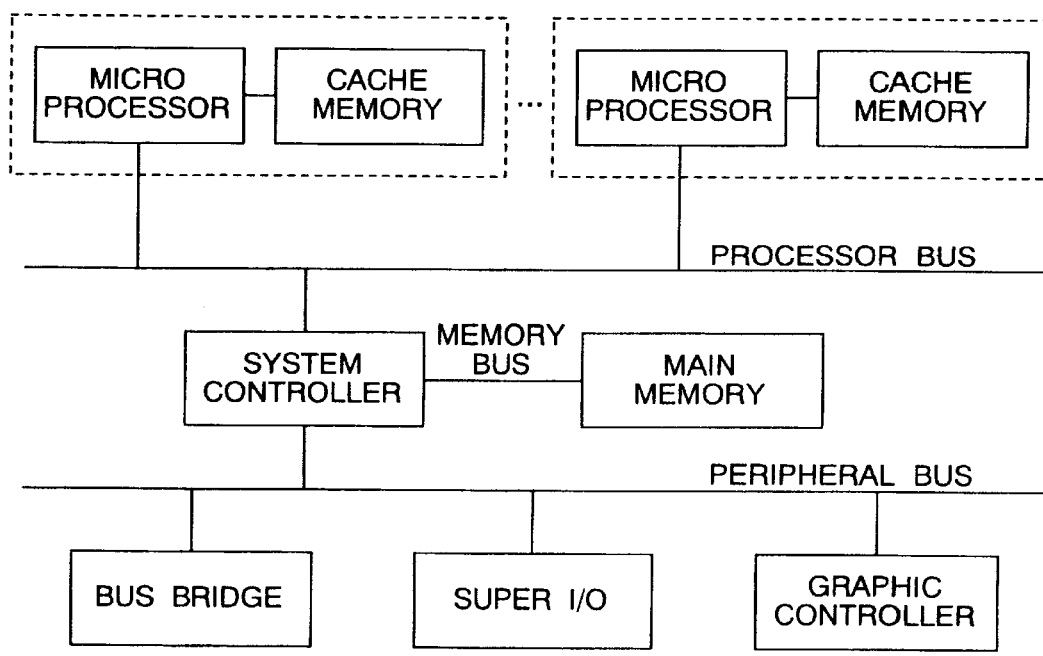
FIG. 17 is a block diagram of an information processing system.

While the embodiments which will be mentioned below concern examples of the memory bus in the memory system, the present invention is not limited to the memory buses, but may be applied to other various buses required to fast transmit signals as in the workstation and personal computer, or to signal wiring conductors such as the system bus (processor bus), memory bus and peripheral bus shown in FIG. 17.

One embodiment (the first embodiment) of the invention will be described with reference to FIGS. 1, 4 and 6 which show the transmission lines for connecting the memory controller and the memory modules, FIGS. 28–31 and 35 which show the memory controller in detail, FIGS. 21, 40 and 41 which show the memory modules in detail, and FIGS. 13–16, 18–20, and 22–25 which show modifications of the system with those components mounted.

FIG. 4 is a basic diagram of a transmission line pattern and connection between the transmission lines and connectors according to the first embodiment of the invention. Referring to FIG. 4, the memory controller 32 has output circuits 11, 12 and input circuits 13, 14. The output circuit 11 and input circuit 13 are circuits for a clock signal. The output circuit 12 and input circuit 14 are circuits for a data signal. There are also shown a clock transmission line 15 for transmitting the clock, a data write transmission line 16 and a data read transmission line 17. In addition, there are shown connectors 34A–34F to which the memory modules with memory devices mounted are connected. The memory controller 32, the transmission lines 15, 16, 17 and the connectors 34A–34F are mounted on a circuit board (mother board) shown in FIG. 3 at 33.

In addition, there are shown transmission lines 15A, 15B, 16A and 17A which are laid on a board (module) different from the mother board when the memory controller 32 is mounted on that module. Even when the memory controller 32 is mounted on the mother board, those transmission lines are sometimes formed on the mother board depending on the layout on the mother board, but they are not necessarily provided.

The connectors 34A–34F are mounted in parallel in one direction on the mother board as shown in FIG. 3. The transmission lines 15–17 are extended from the memory controller 32 to intersect the connectors 34A–34F in order, and after they intersect the farthest connector 34F they are bent back (U turn), and again intersect the connectors 34F-34A in the reverse order. In FIG. 4, the small black circles indicate the junctions between the conductors 15–17 and the connectors 34A–34F.

The clock transmission line and data write transmission line 16 are connected to the connectors 34A, 34C . . . 34E before they are bent back, and connected to the connectors 34F . . . 34D, 34B after the U turn.

The data read transmission line 17 is connected in the reverse relation to that of the clock transmission line 15 and data write transmission line 16. In other words, the transmission line 17 is connected to the transmission lines 34B, 34D . . . 34F before the U turn, and connected to the connectors 34E . . . 34C, 34A after the U turn.

Thus, when the transmission lines are connected to the alternate connectors, the loads to the transmission lines are uniform.

Although the clock transmission line 15, data write transmission line 16 and data read transmission line 17 are respectively a single line as shown in FIG. 4, the number of the respective transmission lines may be arbitrary.

Figure 18:
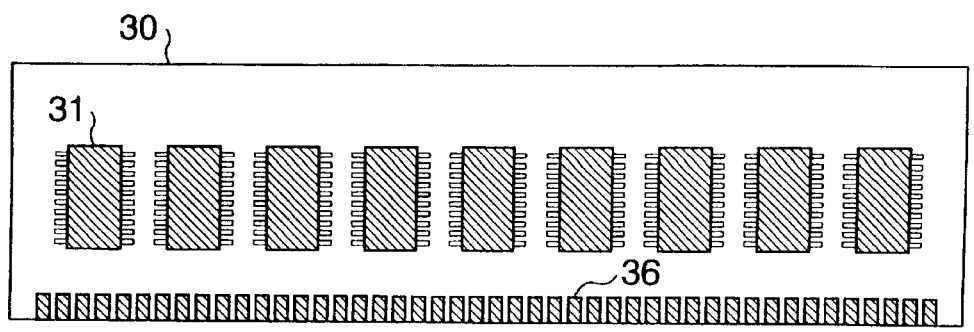
FIG. 18 shows the external appearance of a memory module.

The memory modules 30 are mounted in the connectors 34A–34F. FIGS. 18–27 show examples of the memory modules. The memory module 30 has a plurality of memory LSIs mounted as shown in FIG. 18. The memory LSI is desirably a clock synchronous type memory, for example, SDRAM. The SDRAM receives a control signal and address signal, writes data or read data in synchronism with the clock.

Figure 19:
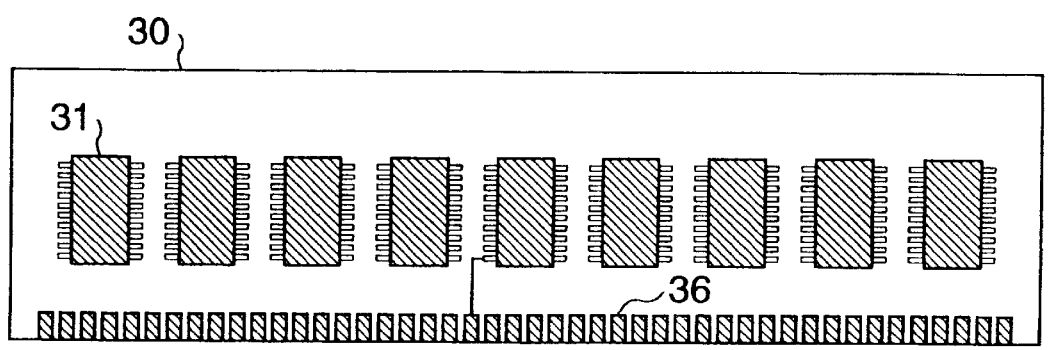
FIG. 19 shows a transmission line for data on the memory module.
Figure 20:
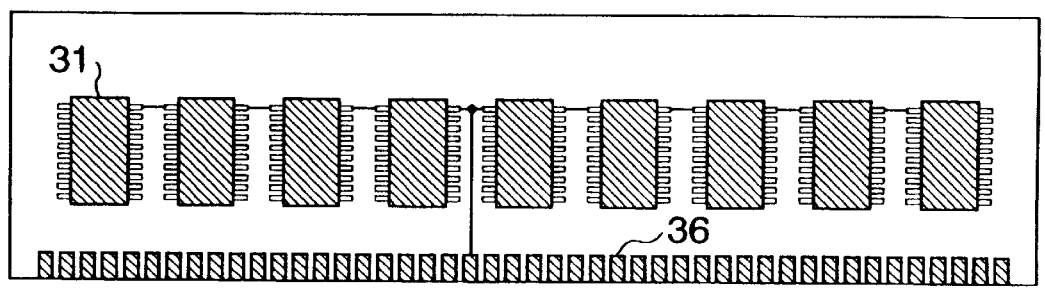
FIG. 20 shows transmission lines for address/control/clock signals.

In the memory module 30, the data line is connected between a single contact 36 of the module and a single pin of the SDRAM as shown in FIG. 19. The line for the control signal and address signal is connected between a single contact 36 of the module and the pins of a plurality of SDRAMs as shown in FIG. 20. While the signals are distributed to all the SDRAMs as in FIG. 20, the signals may be distributed from one contact 36 to some of the SDRAMs on the module, for example, a plurality of CAS (Column Address Strobe) signals may be fed to one module.

Figure 22:
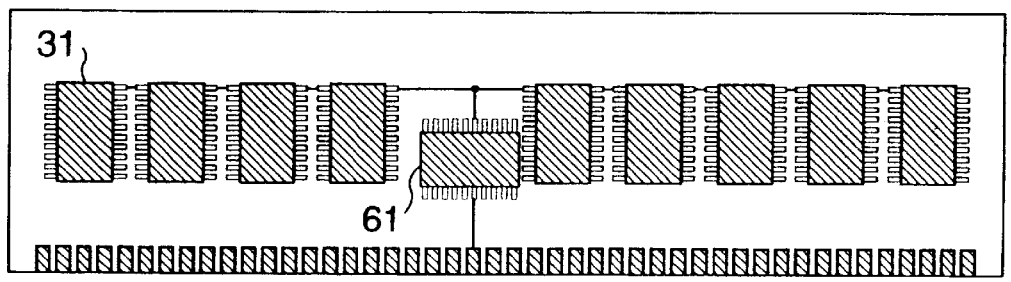
FIG. 22 shows a buffer circuit inserted in the transmission lines for address/control/clock signals on the memory module.
Figure 23:
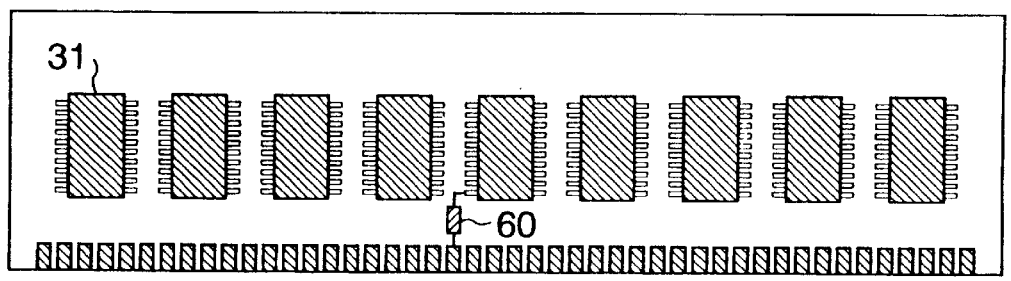
FIG. 23 shows a resistor inserted in the transmission line for data on the memory module.
Figure 24:
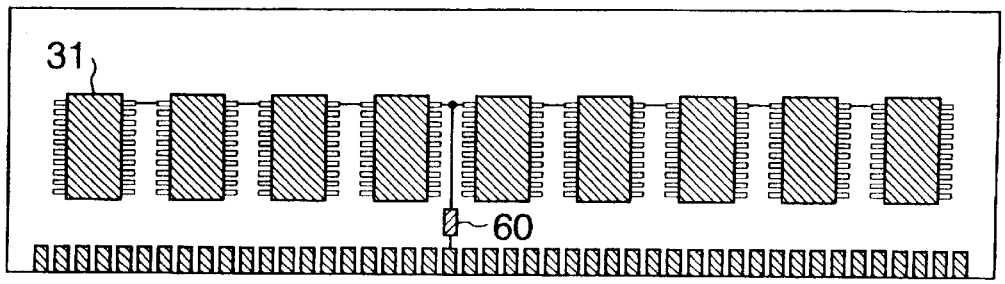
FIG. 24 shows a resistor inserted in the conductors for address/control/clock signals on the memory module.
Figure 25:
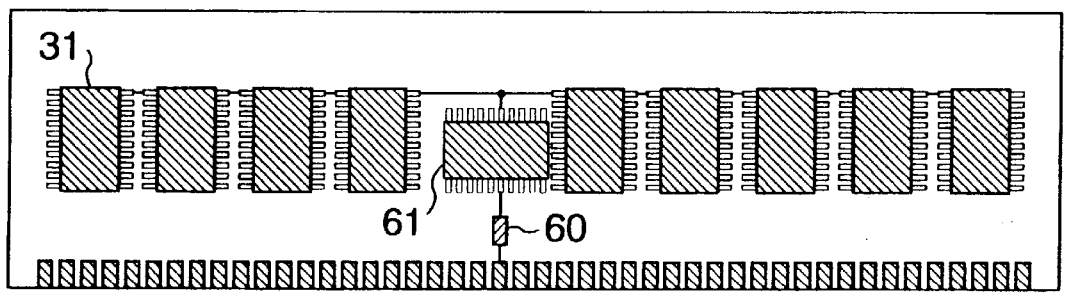
FIG. 25 shows a buffer circuit and resistor inserted in the transmission lines for address/control/clock signals on the memory module.
Figure 26:
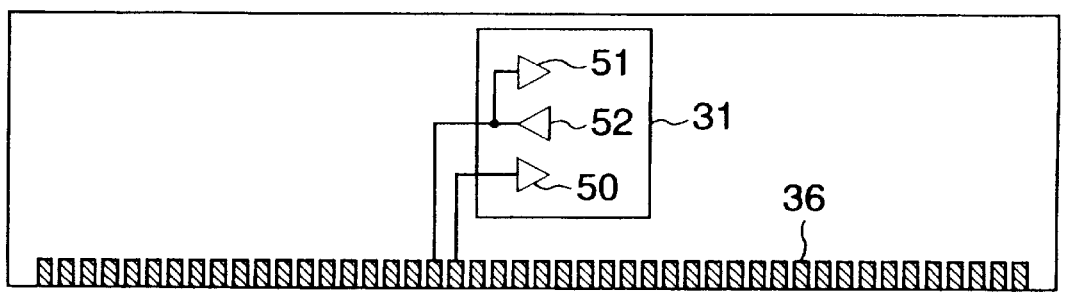
FIG. 26 shows an SDRAM circuit of the input/output common type on the memory module.
Figure 27:
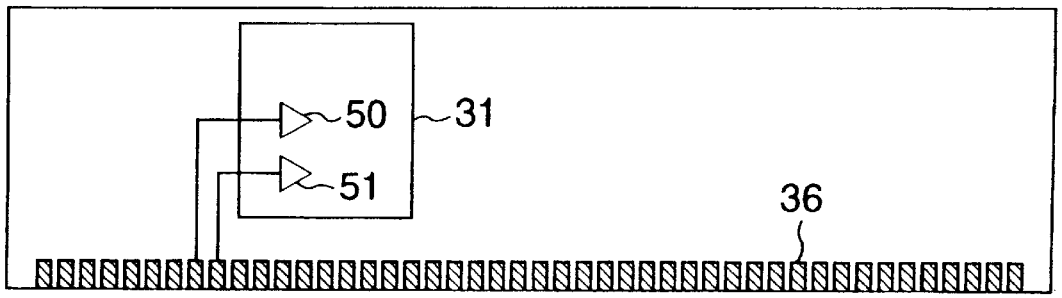
FIG. 27 shows the address/control/clock signal input circuit of the SDRAM on the module.

In addition, there are cases in which a buffer circuit 61 is connected between the contact 36 and the SDRAM as shown in FIG. 22, a resistor 60 is inserted in the data signal line as shown in FIG. 23, the resistor 60 is inserted in the control signal/address signal line as shown in FIG. 24, and both the buffer circuit 61 and the resistor 60 are inserted between the contact and the SDRAM as shown in FIG. 25.

The resistor inserted as in FIG. 23 is for the impedance matching between the transmission lines on the mother board and module, as described in detail in the Japanese Patent Application No. 5-334631 (Patent Laid-open Gazette No. 7-202947), and Japanese Patent Application No. 7-26495 (Patent Laid-open Gazette No. 7-283836).

Figure 21:
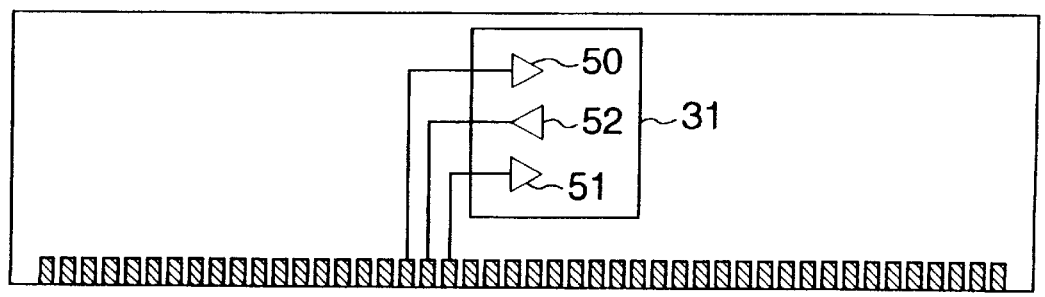
FIG. 21 shows an SDRAM circuit of the input-output separation type on the memory module.

FIG. 21 shows a single SDRAM on the memory module 30 with the other circuits omitted. The SDRAM in FIG. 21 is of the input/output separation type. That is, the SDRAM has an input circuit 50 for receiving the clock, an input circuit 51 for receiving data, and an output circuit 52 for producing data.

The existing SDRAM is of the input/output common type in which the input portion of the input circuit and the output portion of the output circuit are common to each other within the LSI as described later. Here, however, the separation type will be described in which the input portion of the input circuit is separated from the output portion of the output circuit.

In the SDRAM 31, data is received, or written by the input circuit 51 and produced, or read from the output circuit 52 in synchronism with the clock signal received by the input circuit 50.

The memory system of this embodiment has usually memory modules 30 connected to some or all of the connectors 34.

FIG. 4 shows an example of the process for writing data in the memory modules 30 of the memory system having the memory modules 30, shown in FIG. 21, connected to the connectors on the mother board.

The output circuits 12, 11 of the memory controller 32 produce writing data and clock signal, respectively. The clock signal may be generated only at the time of writing or always produced continuously.

The generated clock signal is transmitted to the clock transmission line 15, the connectors 34A, 34C, 34E, 34F, . . . , 34D, 34B in order and again back to the memory controller. The write data is also similarly transmitted to the connectors since it is connected to the connectors in the same order.

The SDRAM 31 of the memory modules 30 connected to arbitrary ones of the connectors 34 receives data from the input circuit 51 in synchronism with the clock signal received by the input circuit 50.

When the memory controller reads data, the memory controller 32 generates the clock signal and the control signal including the address for reading data. The control signal produced from the memory controller 32 is received by the SDRAM 31 in the same manner as at the writing time.

The SDRAM 31 permits the output circuit 52 to supply the associated data to the data read transmission line 17 in synchronism with the clock signal received by the input circuit 50.

The data read transmission line 17 is connected to the connectors in the reverse order to the data write transmission line 16. If the above memory module is connected to the connector 34, the data from the output circuit 52 of the SDRAM 31 is transmitted through the junctions between the transmission line and the connectors 34, 34C, . . . , 34E, 34F, . . . , 34D, 34B in turn, and arrives at the memory controller. The clock signal at which the SPRAM 31 produces data is used for synchronization with the data output at connector 34A. The clock signal is passed through the junctions between the transmission line and the connectors 34A, 34C, . . . , 34E, 34F, . . . , 34D, 34B and back to the memory controller in the same way as is the data on the read transmission line 17.

In the memory controller 32, the receiving circuit 14 receives the read data in synchronism with the clock signal which is fed back through the clock transmission line and received by the receiving circuit 13.

Since the read data and the clock signal are transmitted substantially the same distance from the memory module 30 to the memory controller 32, the difference between the delays of those signals can be neglected.

Thus, the times in which the clock signal and the write data signal reach an arbitrary memory module or the distances that they are transmitted are made substantially equal irrespective of the location at which the memory module is connected. In addition, the time in which the read data reaches the memory controller from the memory module can be made substantially coincident with the time in which the clock signal is fed back to the memory controller from the same memory module.

Thus, the sum of the data writing propagation time and data reading propagation time is substantially constant independently of the memory module position. Consequently, the tpd(max-min) can be reduced in the condition of $t_{window} > t_{pd}(max-min) + t_{setup}(max) + t_{hold}(max)$, and hence the margin of the window can be ensured.

In other words, since the time of $t_{window} - t_{pd}(max-min)$ becomes large as described above, it is easily insure a time that is longer than the setup time and hold time.

FIG. 4 also shows one example of the way in which the transmission lines are connected to the alternate connectors before and after the U turn.

If it is assumed that the "forward portion" of the clock transmission line is from the output circuit 11 to the farthest (from the memory controller) connector 34F, the "backward portion" is from the connector 34F to the input circuit, similarly the "forward portion" of the write data transmission line is from the output circuit 12 to the connector 34F, the remaining portion (from the fore end of the forward portion to the memory module side) thereof is "returning portion", the "returning portion" of the read data transmission line is from the connector 34F to the input circuit 14, and the remaining portion (namely, the backward portion from the connector 34A to the connector 34F) is "forward portion", then the connectors can be connected under the following rule.

(1) When the "forward portion" of the clock transmission line is connected to connectors, the "forward portion" of the write data transmission line is connected to the transmission lines, and the "returning portion" of the read data transmission line is connected to the connectors.

(2) When the "backward portion" of the clock transmission line is connected to connectors, the "returning portion" of the write data transmission line is connected to the connectors, and the "forward portion" of the read data transmission line is connected to the connectors. For higher precision, the transmission line layout can be performed under the following considerations.

(1) The length of the transmission line 15 from the output circuit 11 to the input circuit 50 within the module is made coincident with that of the transmission line 16 from the output circuit 12 to the input circuit 51 within the module or the transmission line loads are made coincident.

(2) The length of the transmission line 16 from the output circuit 12 to the input circuit 51 within the module is made equal to that of the transmission line 17 from the output circuit 52 within the module to the input circuit 14 or the transmission line loads are made coincident.

If the precision is increased by the equalization of the transmission line lengths or transmission line loads, the $t_{window} - t_{pd}(max-min)$ can be increased the more.

To offset the clock phases, (1) A circuit for making propagation delay, for example, a delay circuit is provided on the memory controller or on any one of the clock transmission lines connected to the memory modules. This circuit may be placed on all the transmission lines or only on any signal transmission line.

(2) The delay circuit function at (1) is provided on the clock generator or on the distribution/frequency divider side. At this time, the delay preferably should be made adjustable by an external pin. For this purpose, some delay circuits are built in the clock sources and selected by external means or a plurality of delay circuits are provided and selectively specified by external means.

Moreover, it is recommended that when the clock signal and data signal are supplied through the transmission lines between the memory controller and the connectors, both the "forward portion" and the "backward portion (or returning portion)" rather than only one of them are dispersedly connected to the connectors. The reason is that the connection loads can be distributed to the connectors, thus suppressing the reduction of the effective impedance of the signal transmission lines.

The suppression of the impedance drop will result in the following facts.

(1) When the output signals from the output circuits are switched, it is possible to first suppress the amplitude reduction of the signal transmitted to the memory module.

Particularly when the signal amplitude is small, the first-wave signal with a small amplitude is produced from the output circuit due to the impedance drop, and as a result the noise margin of the input signal is reduced, thus preventing the cause of occasional erroneous operation.

(2) It is possible to improve the quality for various uses.

The user connects memory modules to all or some of the connectors. In order to assure that the performance is kept satisfactory under all the conditions, it is necessary to reduce the amount of change of the characteristic of the system, or the effective impedance of the transmission lines. Thus, the performance margin can be ensured, leading to high quality.

The most effective transmission line/connector connection is the connection between the alternate "forward portion" and "backward portion (or returning portion)" to the connectors as shown in FIG. 4.

Moreover, the impedance drop can be suppressed by use of signal transmission lines 15, 16 or 17 of which the impedance is lower than that of the modules. For example, an impedance of about 50 Ω (for example, 40 to 60 Ω) is selected.

The effective impedance is reduced to 20 to 30 Ω when the module is mounted, but any one of the transmission lines of 50 Ω and 75 Ω is reduced to substantially an equal value. In other words, while the transmission line of 50-Ω impedance is used in this case, the difference between the impedances before and after mounting the module can be decreased.

While in this embodiment the four circuits 11 to 14 are included within the single circuit block 32, the present invention is not limited to that structure, but may take the construction in which these circuits are separately distributed to a plurality of different circuit blocks. From the performance and cost point of view, preferably the four circuits should be included in one circuit block.

However, considering the existing memory controller structure, it is desired that only the output circuit for producing the clock signal be provided within another different circuit block.

Moreover, while this embodiment can be applied to both cases of writing data in and reading data from the memory module as described above, it is possible that only the data writing is made by the clock distribution method according to the invention with the data reading made by the conventional method. Such a compromise between the invention and the prior art and alternative examples of circuit construction may be used in the following embodiments.

Figure 6:
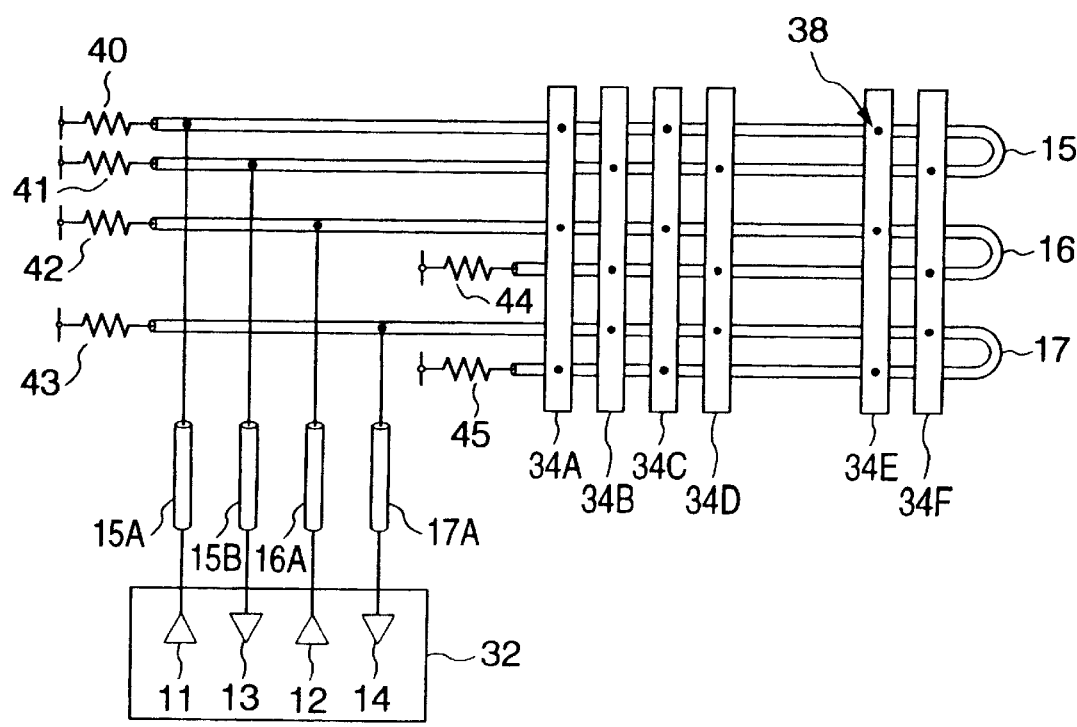
FIG. 6 is a diagram for another modification of the first embodiment of the invention, showing a connection relation between the memory controller and memory modules, and a pattern of transmission lines.

FIG. 6 shows a modification of the embodiment of FIG. 4, with termination resistors 40–45 added to the transmission lines 15–17. The termination resistors are of course connected to terminating power supply.

Although the termination resistors are connected to both ends of each transmission line as illustrated in FIG. 6, termination resistors may be connected to only one ends of the transmission lines, in which case the effect is good. Although both end termination is more effective, even the one-end termination is permissible when signals are only in one direction, for example, when the transmission lines are the control signal line and address signal line. In this case, the opposite ends to the output circuits should be terminated.

The values of the termination resistors are often equal to the impedances of the transmission lines, respectively. To be more effective, the transmission lines should be terminated with the effective impedances of the transmission lines. In this case, those values are not necessarily strict, but may have a deviation of about ±20 Ω.

Figure 1:
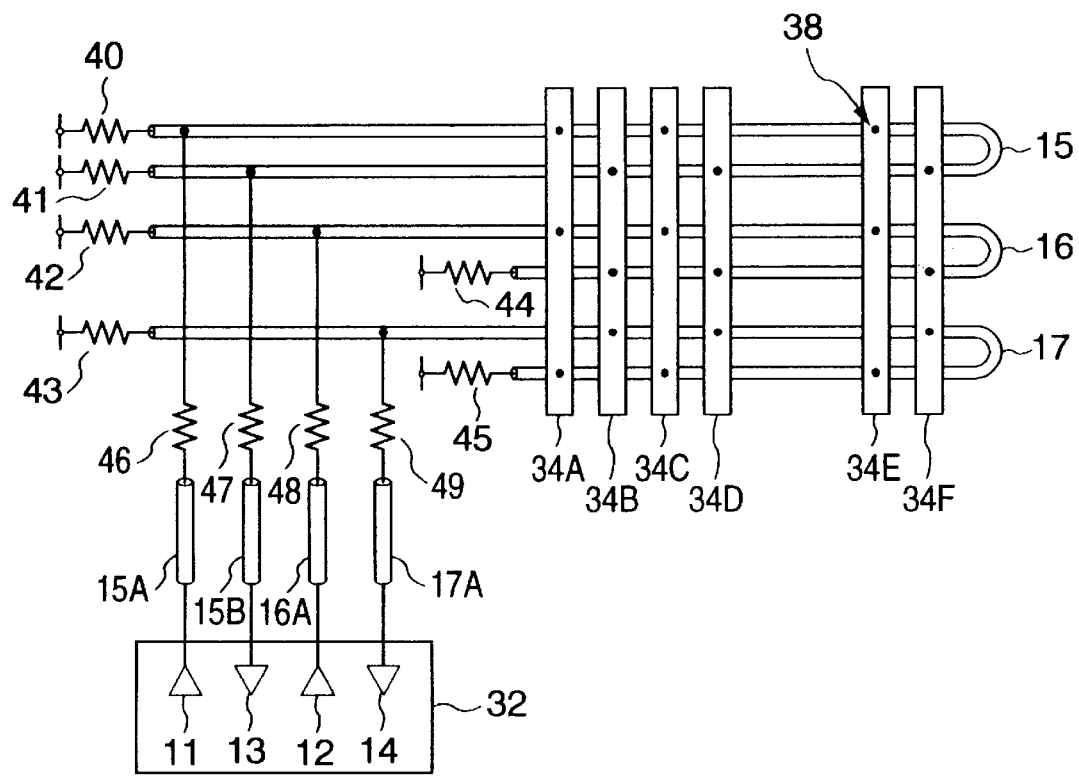
FIG. 1 is a diagram for a modification of the first embodiment of the invention, showing a memory controller and a pattern of transmission lines through which the memory controller is connected to memory modules.
Figure 2:
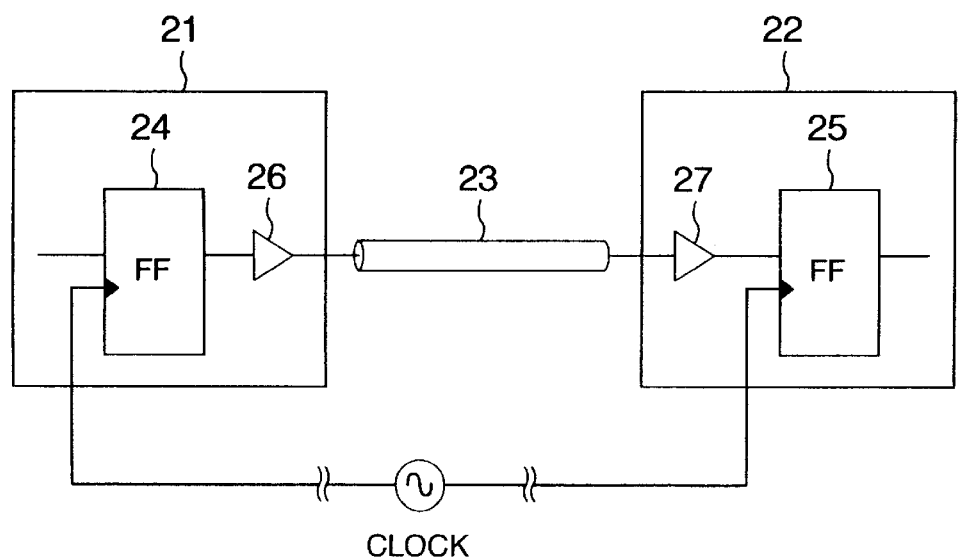
FIG. 2 shows a conventional signal transmission system of the single-phase clock system.

FIG. 1 shows an example of matching resistors 46, 47, 48, 49 inserted between the branch transmission lines 15A, 15B, 16A, 17A and the transmission lines 15, 16, 17. The matching resistors are inserted in order to reduce the amplitudes of signals on the transmission lines 15–17 and to suppress the reflection of signals from the branch points of transmission lines 15–17 by impedance matching between transmission lines 15–17.

These matching resistors are described in detail in JP-A-7-202947, and JP-A-7-283836 previously filed by this applicant.

These resistors are effective to suppress the reflection of signals from the junctions when signals are propagated from the branch lines to the main transmission lines. The values of these resistors should be set to the impedances of the branch lines 15A, 15B, 16A, 17A minus the halves of the impedances of the transmission lines 15, 16, 17. When the effective impedance of the main transmission line is decreased by mounting the memory module on the main transmission line, the effective impedance should be used in place of the impedance of the main transmission line.

It is desired to set the resistance values in the range of 0.5 to 1.5 times the previously estimated value. About twice the value will be effective in fast operation due to low amplitude.

When the matching resistors 46, 47, 48, 49 are provided as in FIG. 1, it is also desired that resistors be mounted on the memory module side as illustrated in FIGS. 23, 24 and 25. These resistors have desirably the values suitable for matching between the transmission lines within the memory module and the conductors 15, 16, 17 on the mother board and to thereby achieve low amplitudes of signals on the transmission lines 15–17. The resistance values are determined in the same way as in the above matching resistors 46–49. At that time, the branch lines are calculated as the transmission lines within the memory module.

Figure 5:
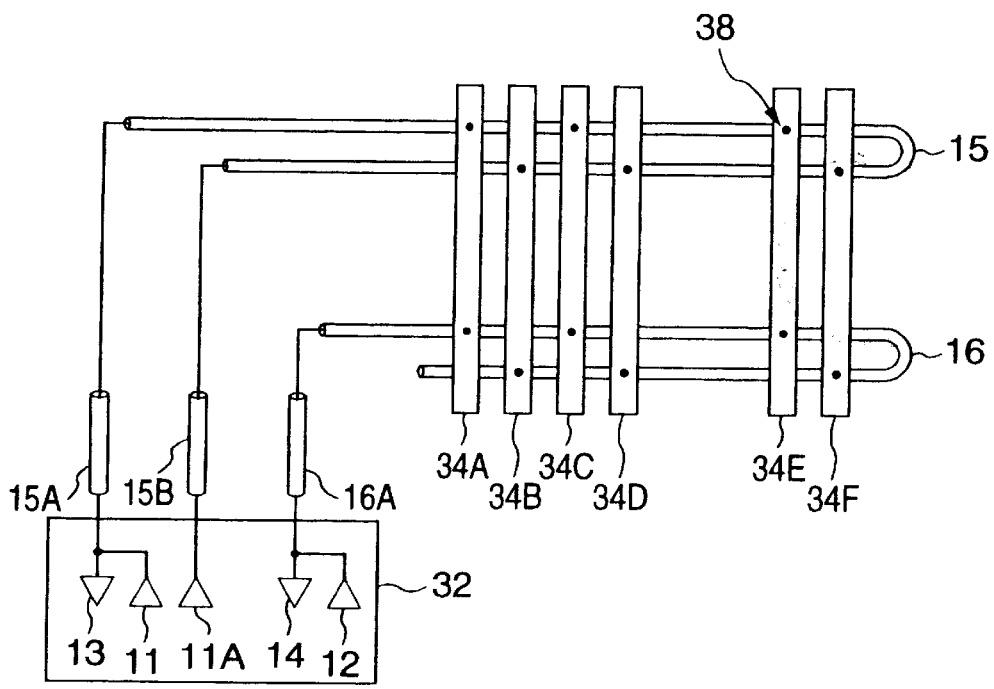
FIG. 5 is a diagram for the second embodiment of the invention, showing a connection relation between the memory controller and memory modules and a pattern of transmission lines. This figure also shows that when this invention is applied to an input/output common type circuit, the direction of the clock signal at the reading time is opposite to that at the writing time.

FIG. 5 shows another embodiment (embodiment 2) of the invention. Like elements corresponding to those in the previous embodiment will not be described.

In this embodiment, the clock signal generated from the memory controller 32 is separated into the read clock and write clock, and those clock signals are transmitted on the same clock transmission line 15 in the opposite directions, respectively. Referring to FIG. 5, there are shown the output circuit 11 for the write clock, the output circuit 11A for the read clock, and the receiving circuit 13 for receiving the clock for receiving the read data by the memory controller 32. Also, there are shown the output circuit 12 for producing data and the receiving (input) circuit 14 for receiving data.

Although not shown in FIG. 5, it is desired that the output circuits 11, 11A have, provided within the memory controller 32, logic circuits for controlling their outputs.

In the same way as in the first embodiment, if it is assumed that the "forward portion" of the clock transmission line 15 is the portion from the output circuit 11 to the (farthest from the memory controller) connector 34F, the "backward portion" thereof is the portion from the fore end of the "forward portion", or from the connector 34F to the connector 34A, the "forward portion" of the data transmission line 16 is the portion from the output circuit 12 to the connector 34F, and the "returning portion" thereof is the remaining portion (namely, from the fore end of the "forward portion" to the memory module side), then the connectors can be connected under the following rule.

(1) When the connectors are connected to the "forward portion" of the clock transmission line, the "forward portion" of the data transmission line is connected to the connectors.

(2) When the connectors are connected to the "backward portion" of the clock transmission line, the "returning portion" of the data transmission line is connected to the connectors.

Thus, the same effect as in the first embodiment can be achieved by reducing the data signal transmission line to a half, or reducing two write and read transmission lines to a single write/read common transmission line.

The output portion of the output circuit for write clock and the input portion of the input circuit for read clock can be connected within or out of the circuit block (integrated circuit and component). (FIG. 5 shows an example of the connection within the circuit block).

The second embodiment is the application to the type in which the memory LSIs mounted in the memory module has an input/output common circuit for I/O, or including both input circuit and output circuit. The circuits within the module in this embodiment have a construction of FIG. 26, while those in the first embodiment is shown in FIG. 21. That is, the module in FIG. 26 has connected therein the output circuit 51 for producing data and the receiving circuit 52 for receiving data.

Figure 7:
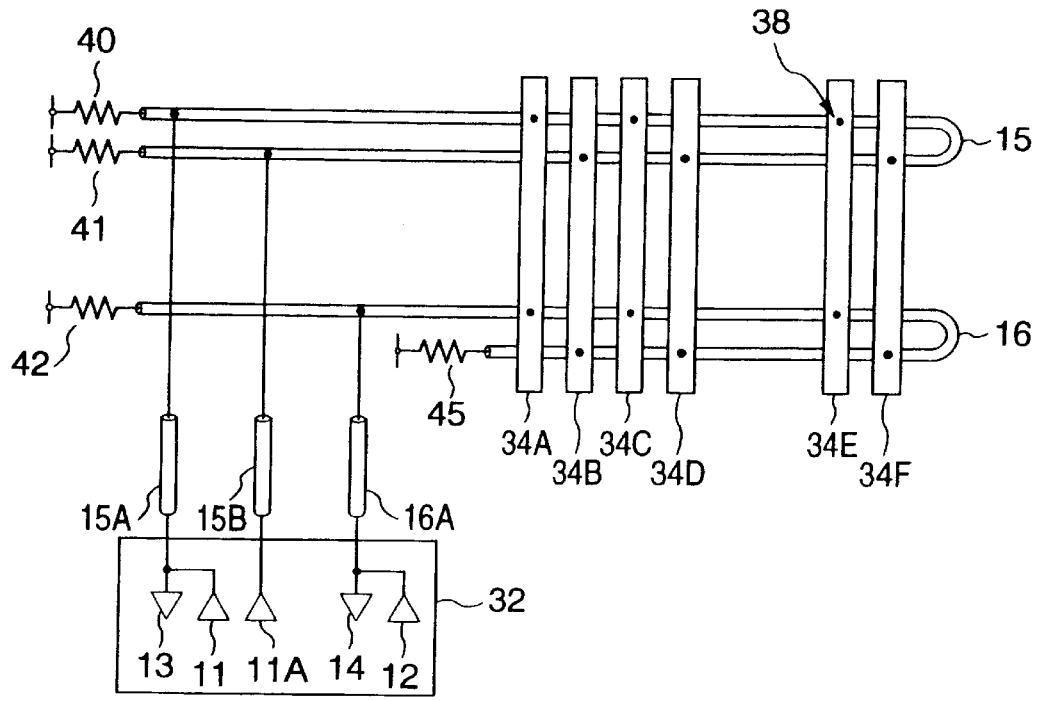
FIGS. 7 and 8 are diagrams for modifications of the second embodiment of the invention, each showing a connection relation between the memory controller and memory modules and a pattern of wiring conductors.
Figure 8:
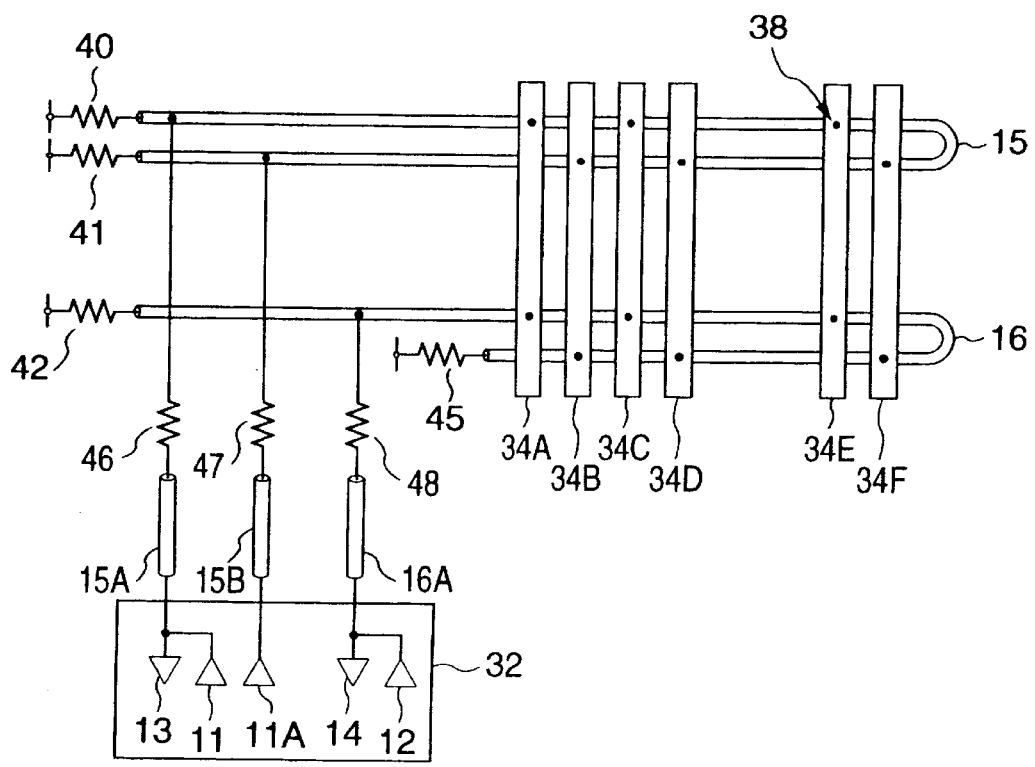

FIG. 7 shows a modification of the second embodiment, or the type in which the memory controller 32 is connected through the branch lines 15A–16A to the transmission lines 15, 16 (the same type as in the first embodiment of FIG. 6). FIG. 8 shows another modification, or the type in which the matching resistors 46–48 are connected between the branch line 15A–16A and the transmission line 15, 16 (the same type as in the first embodiment of FIG. 1).

Figure 9:
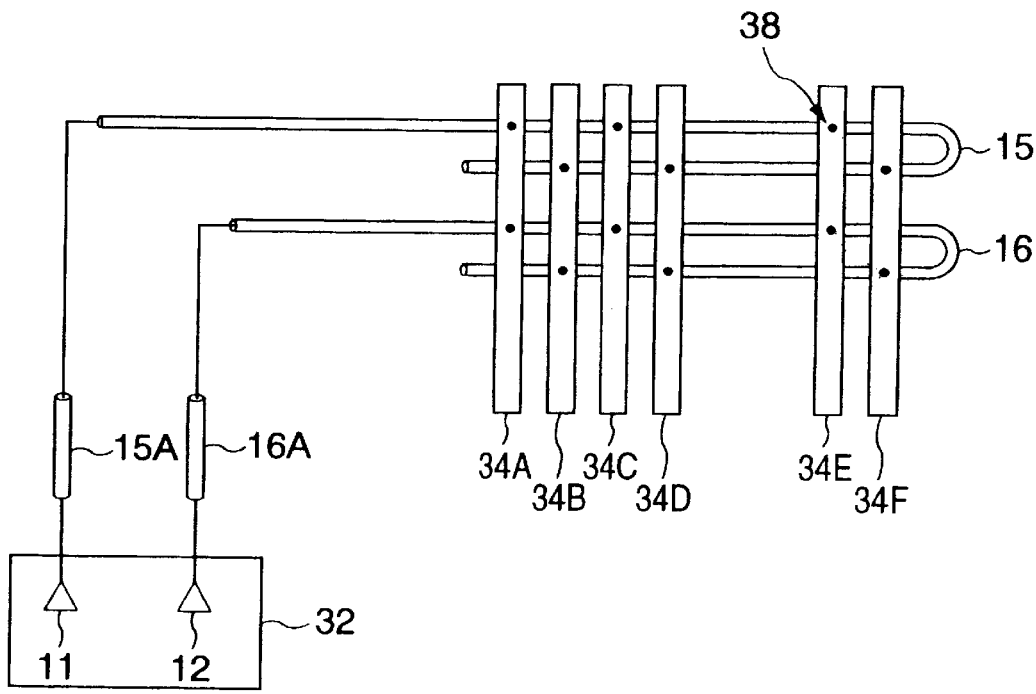
FIG. 9 is a diagram for the third embodiment of the invention, showing a connection relation between the memory controller and memory modules and a pattern of transmission lines. This embodiment is the application to the single-direction signal transmission.
Figure 10:
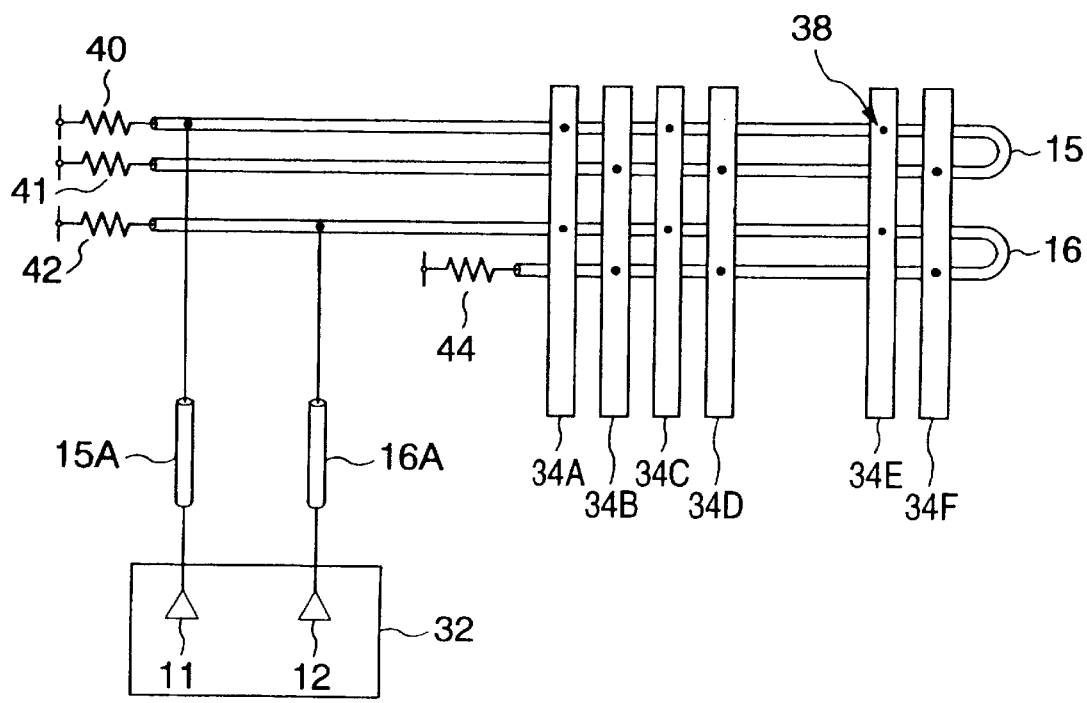
FIGS. 10 and 11 are diagrams for modifications of the third embodiment of the invention, each showing a connection relation between the memory controller and memory modules and a pattern of transmission lines.
Figure 11:
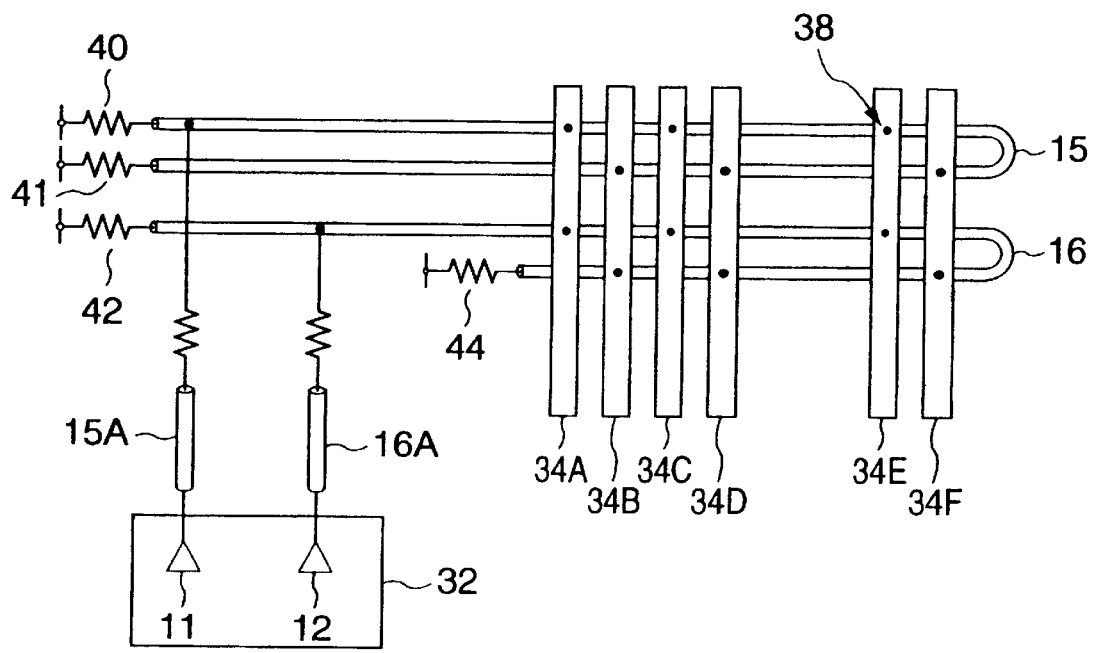

The third embodiment of the invention will be described. Although in the first and second embodiments data signal is bidirectional, the one-direction transmission of address signal or control signal can be easily achieved by eliminating the paths through which the clock returns to the memory controller 32 as shown in FIGS. 9 to 11. This can be applied to the lines exclusively for use in writing data.

In this case, although two kinds of clocks, or the data clock and another signal clock, are supplied to each memory module, the address signal and control signal can be received by use of a data clock circuit. At this time, when there are two clocks as in the second embodiment, the address signal and control signal can be stored in the SDRAM by use of the write clock. The circuit arrangement within the memory module is of the type shown in FIG. 27, while that of the second embodiment is shown in FIG. 21.

Figure 12:
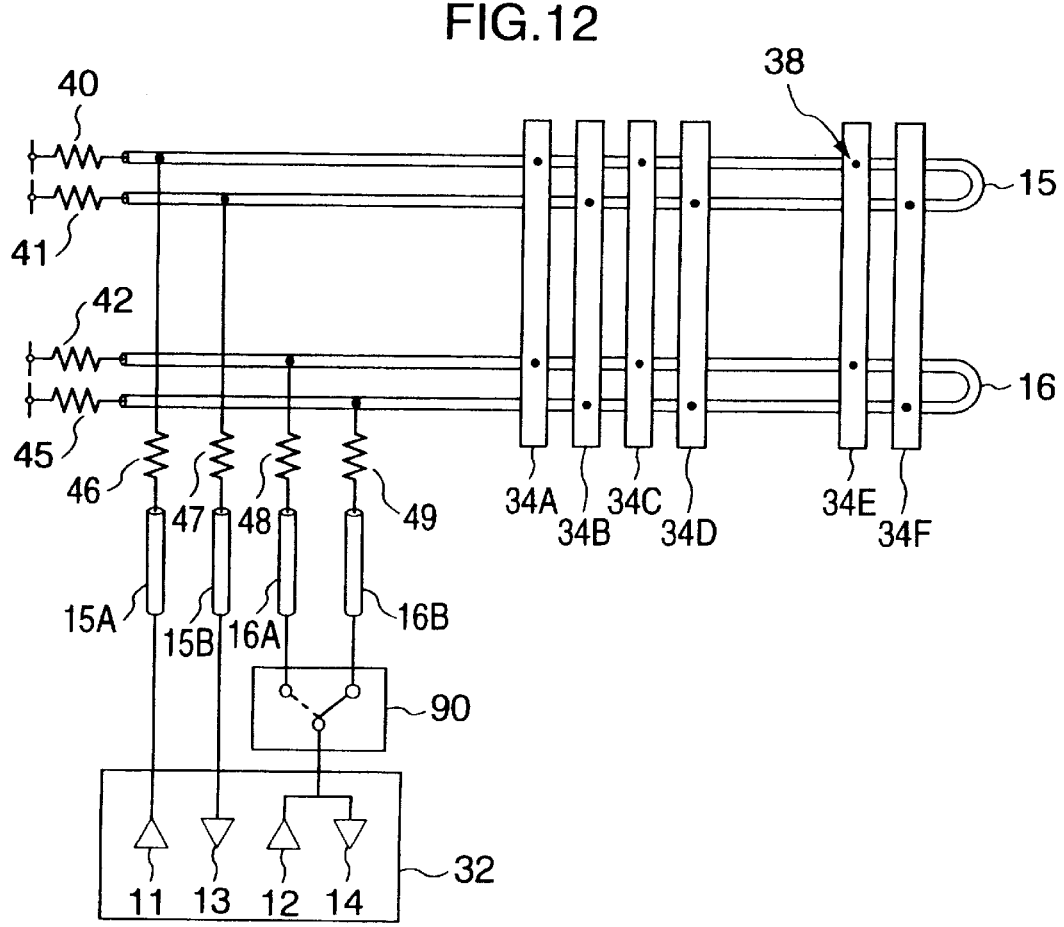
FIG. 12 is a diagram for the fourth embodiment of the invention, showing a connection relation between the memory controller and memory modules and a pattern of transmission lines.

FIG. 12 shows the fourth embodiment of the invention associated with the second embodiment. When the memory controller 32 with common I/O is used, the clock signal can be propagated in only one direction as in the first embodiment.

That is, the clock signal is generated from the output circuit 11, and the writing data signal is produced from the output circuit 12. At this time, a switch 90 operates to connect the input/output circuit (in the illustration, it has separate output circuit 12 and input circuit 14) to the transmission line 16A. Thus, the clock signal and data signal can be transmitted from the memory controller 32 to the connectors 34A–34F through a substantially equal line length, and to the memory module on the connector.

At the time of reading, the switch 90 connects the input/output circuit to the transmission line 16B, so that the data transmitted through the transmission line 16B can be latched at the clock sent through the transmission line 15B. Thus, the clock control system shown in the first embodiment can be used for the circuits having the I/O-common data lines.

In the embodiments 1–4, the clock at which data is latched is generally different in phase from the clock within the memory controller 32. In other words, in order that the read data can be used within the memory controller, it is necessary to change the clock (here, change from the phase of return clock to the phase of internal clock) so that it can be again controlled by the clock within the memory controller. Thus, a retiming circuit, for example, FIFO (First-in First-out) circuit is desirably connected to the output node of the input circuit 14. In addition, means may be provided for deciding at which cycle of internal clock the memory controller 32 latches on the basis of the magnitude of the difference between the phases of the clock propagated through the conductor 15 and the internal clock.

In addition, if the phases of the produced clock and the returning clock are adjusted to be equal by a transmission line length or delay circuit, data can be easily received.

Figure 35:
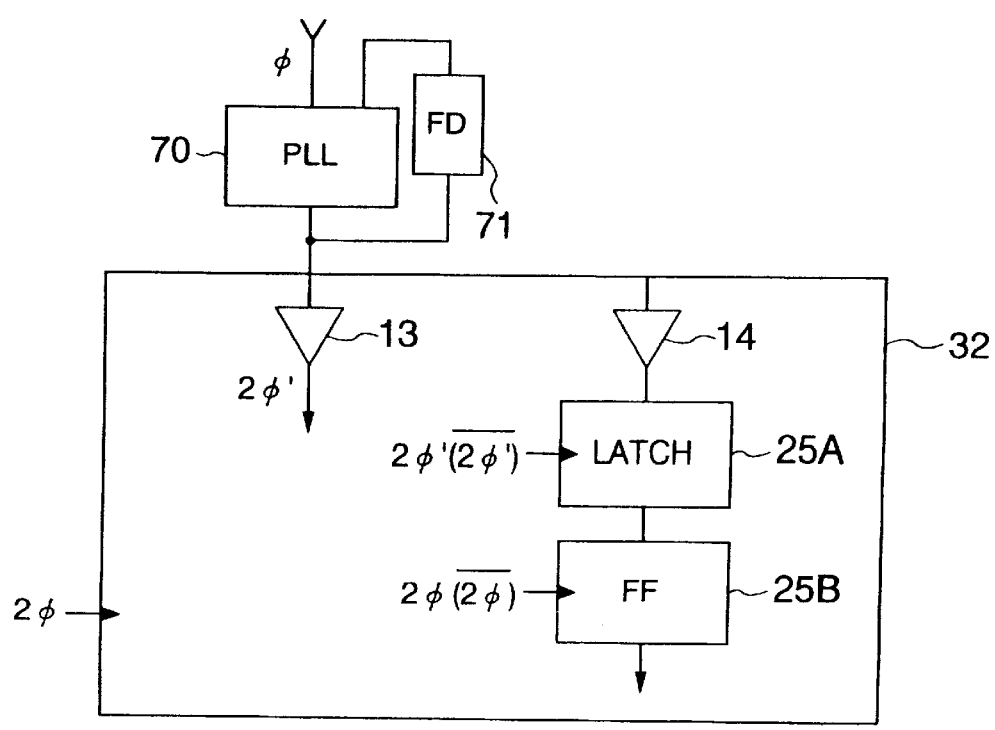
FIG. 35 shows the memory controller with a timing circuit.

FIG. 35 shows an example of the retiming circuit provided in the memory controller 32. The retiming circuit includes at least a D-type latch circuit 25A, and a flip-flop circuit 25B. The D-type latch circuit 25A passes input data through when the input clock is High (or Low) and latches data when the clock turns Low (or High) and holds until the clock again turns High (or Low).

To the D-type latch circuit 25A is supplied the return clock of 2φ positive logic or negative logic as a clock, and to the flip-flop circuit 25B the internal clock of 2φ positive logic or negative logic as a clock in the memory controller 32.

Either one of these clocks is definitely selected according to the magnitude of the phase difference between the clock 2φ within the memory controller 32 and the returning clock 2φ'.

If the phase difference between clocks 2φ and 2φ' is just a half the interval, the negative logic clock 2φ' is supplied to the D-type latch circuit 25A, and the positive logic clock 2φ to the flip-flop circuit 25B so that the deviation can be corrected for.

If the phase of the clock 2φ is just equal to that of the clock 2φ', the negative logic clock 2φ' is supplied to the D-type latch circuit 25A, and the positive logic clock 2φ to the flip-flop circuit 25B.

In other embodiments, if the phases are equal, the flip-flop circuit 25B is not necessary, and thus the output from the latch circuit 25A can be fed directly to the memory controller's inside.

If a clock for the operation of memory modules, other than the clock from the memory controller 32, is supplied to each memory module through a separate conductor, the retiming circuit may be provided on the memory module side.

Figure 36:
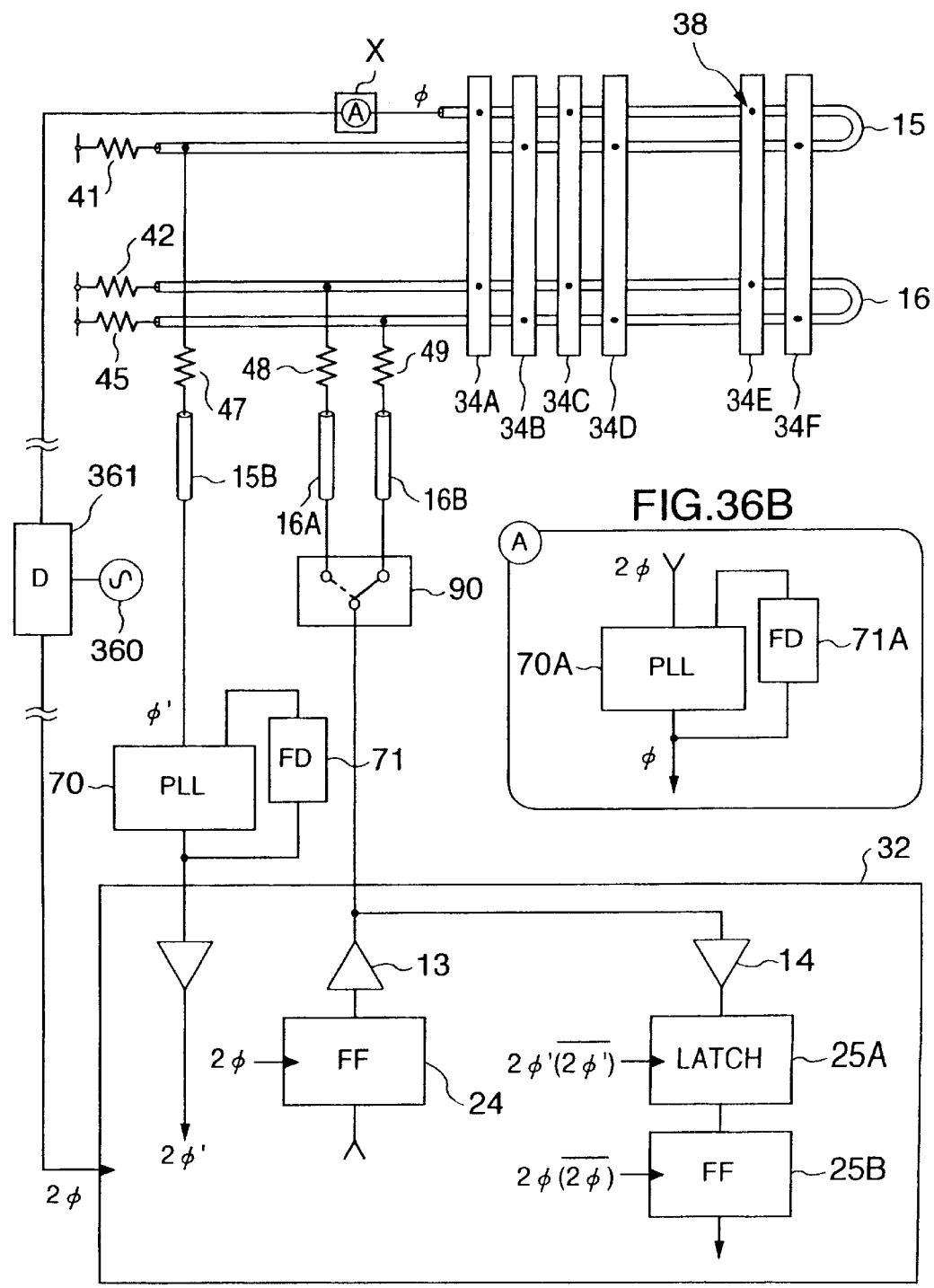
FIG. 36A shows a memory system of the invention which has a retiming circuit according to the invention.
FIG. 36B is an expanded view of a PLL circuit with a frequency dividing circuit as shown X in FIG. 36A.

FIG. 36A shows a modification of the embodiment of FIG. 12, including the retiming circuit shown in FIG. 35. Also, as illustrated in FIG. 36A, the clock φ is produced not from the memory controller 32 but from the clock distribution circuit before the connector 34A. Although the clock shown in FIG. 1, or clock φ may be supplied from the memory controller 32, the clock access time of the memory controller 32 is generally faster than that of the memory LSI. Therefore, the reading operation becomes severer than the writing operation. Thus, the output circuit for clock is moved to the front of the connector 34A from the memory controller 32, so that the phase of the clock can be brought ahead, adjusting the writing and reading times to be equal.

This modification can be applied not only to the embodiment shown in FIG. 12, but also to other embodiments. In addition, as illustrated in FIG. 36A, a PLL (Phase Locked Loop) 70A with a frequency dividing circuit 71A is provided out of the memory controller 32 as shown in FIG. 36B. In other words, the PLL 70A with the frequency dividing circuit 71A is an expanded view of 'X' shown in FIG. 36A. It devides the frequency of the clock signal fed from a clock generator 360 through a clock distribution circuit 361. The PLL 70A may be provided within the memory controller.

Figure 37:
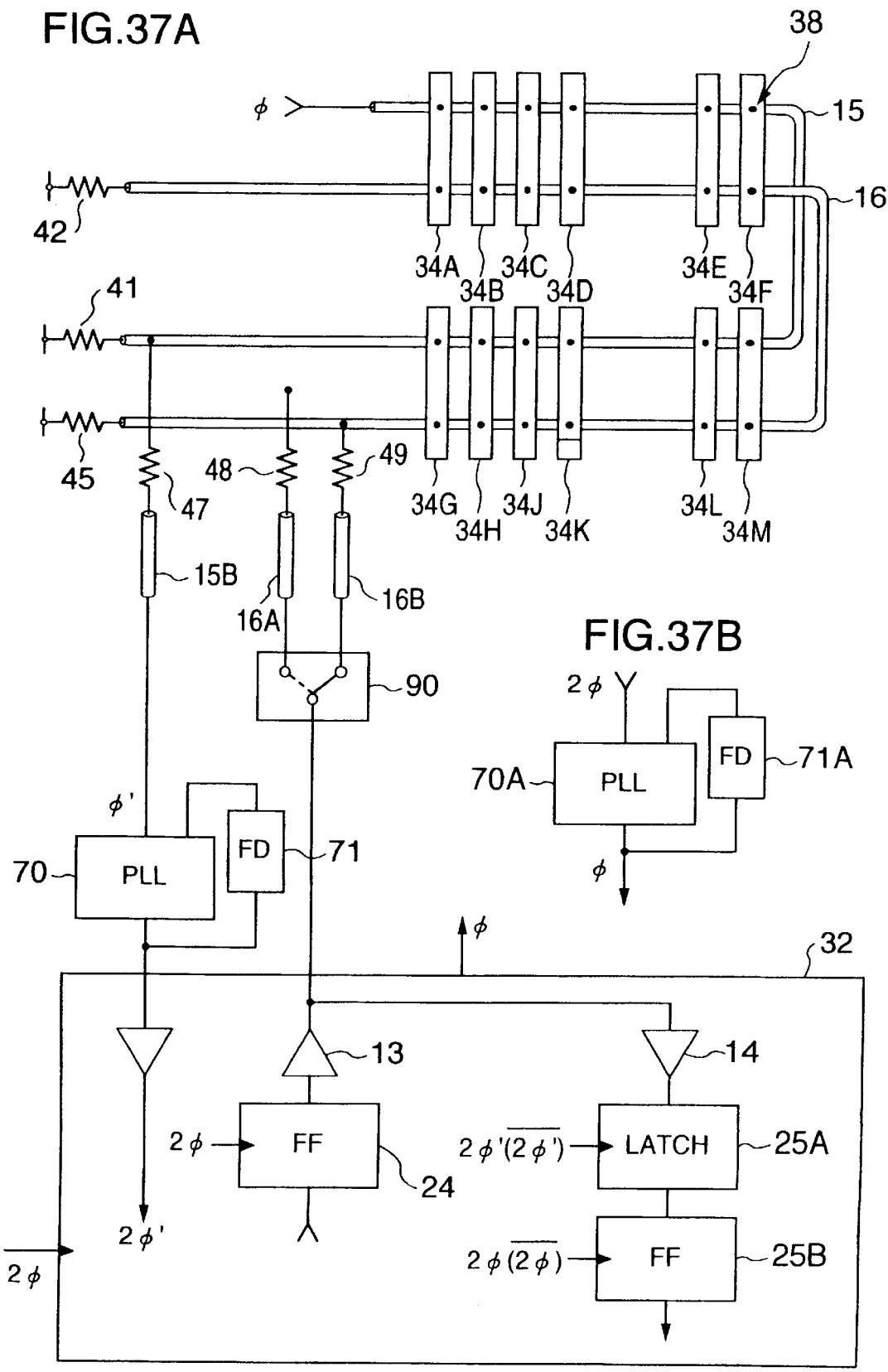
FIG. 37A shows the fifth embodiment of the invention.
FIG. 37B shows a PLL circuit with a frequency dividing circuit provided either outside or inside of the memory controller.

FIG. 37A shows the fifth embodiment of the invention. In this embodiment, the transmission lines 15, 16 are laid out to cross two lows of connectors 34A–34F, 34G–34M.

Although in the previous embodiments the connector row connected to the "forward portion" is the same as that connected to the "backward portion", in this embodiment the connector row (34A–34F) connected to the "forward portion" is different from that (34G–34M) connected to the "backward portion". Thus, the number of transmission lines laid out under the connectors can be halved (reduced from the "forward portion" and "backward portion" to either "forward portion" or "backward portion"), with the result that the layout can be easily made and that the number of layers for signal transmission lines on the circuit board can be decreased.

Although the transmission lines 15, 16 are connected to all the connectors as shown in FIG. 37A, they may be connected to some of the connectors, for example, to alternate connectors.

Although in the figures before FIG. 37A the connectors are connected to either "forward portion" or "backward portion", there may be some connectors that are connected to neither "forward portion" nor "backward portion". For example, it is possible that two parallel lines are laid out, one of which is connected to even-numbered connectors, or 34B, 34D, . . . , 34F, and the other one of which is connected to the odd-numbered connectors, or 34A, 34D, . . . , 34E. FIG. 37B shows a PLL circuit 70A with a frequency dividing circuit 71A, these circuits can be provided either outside of the memory controller 32 or inside thereof.

The modification shown in FIG. 37A can be applied to the embodiments of FIG. 36A, FIG. 12 based on FIG. 36A, and other embodiments.

The sixth embodiments will be described. In the embodiments 1–5, when the memory controller 32 received the data read from the memory module 30, the data was received in synchronism with the clock signal produced from the memory controller 32 and received through the transmission line 15. In the sixth embodiment, a trigger signal for the timing to receive the data from the memory module is generated from the memory module that produces data. The details will be mentioned below.

Figure 46:
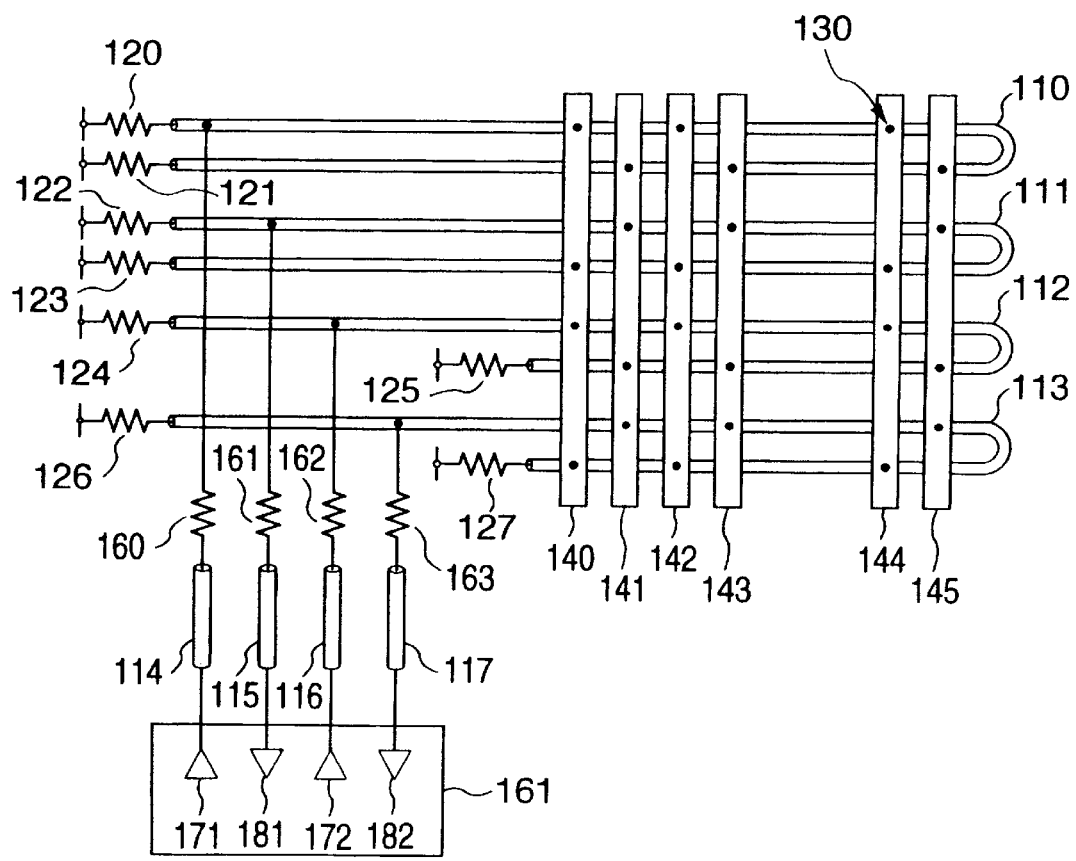
FIG. 46 shows the sixth embodiment of the invention.

FIG. 46 shows the sixth embodiment.

A memory controller 161 includes a clock output circuit 171, a clock synchronous type output circuit 172, an input circuit 181, and an input circuit 182 that synchronizes with the signal received by the input circuit 181. The output circuit 172 and the input circuit 182 are circuits for data.

There are also shown transmission lines 114–117 which are conductors formed when a module of the memory controller 161 is used or formed depending on the layout on the mother board. These transmission lines are not necessarily provided, and the presence or absence of these transmission lines does not limit the present invention.

Although these four circuits are included in one circuit block, they may be separately provided in a plurality of circuit blocks.

The transmission line, 110 is used for transmitting the clock signal that is necessary for the signals from the memory controller 161 to be received at the clock by each memory module mounted on the connectors 140–145.

The transmission line, 111 is used for transmitting the trigger signal (return clock) that is necessary for the data read from the memory of the memory module to be received by the memory controller 161. This trigger signal is generated from the data-read memory.

This trigger signal is different from the clock the memory controller 161 produces, and one pulse is generated as the trigger pulse for a piece of read data.

In addition, this trigger signal is desirably delayed, for example, the setup time of the memory controller or above, from the data so that the read data can be received by the memory controller. Moreover, the memory is desired to hold the data for more than the hold time of the memory controller from the start of the trigger signal.

As illustrated in FIG. 46, two transmission lines are respectively provided for the clock signal and data signal in the memory circuit with the other circuits omitted. Thus, although two pairs of input circuit and output circuit are provided, the number of circuits does not limit the invention.

The junctions between the transmission lines and the connectors are indicated by small black circles.

That is, in FIG. 46, the clock signal produced from the memory controller is transmitted on the signal transmission line 110 and to the connectors 140, 142, . . . , 141. The data write signal transmission line 112 is connected to the connectors in the same order as the clock transmission line.

The data read transmission line 113 and the transmission line 111 for the trigger from the memory are connected to the connectors in the reverse order to the data write transmission line. In other words, the data write transmission line is connected to the transmission lines 141, 143, . . . , 140 in turn from the memory controller side.

Thus, the sum of the data write propagation time and the read propagation time is constant independently of the memory controller position.

At this time, it is desired to design so that the propagation time on each of the clock transmission line, trigger transmission line, data write transmission line and read transmission line is equal.

When there is a connector in which no memory module is connected, a dummy load equivalent to the memory module is sometimes mounted to suppress the change of the effective impedance due to the change of the number of mounted modules.

Figure 47:
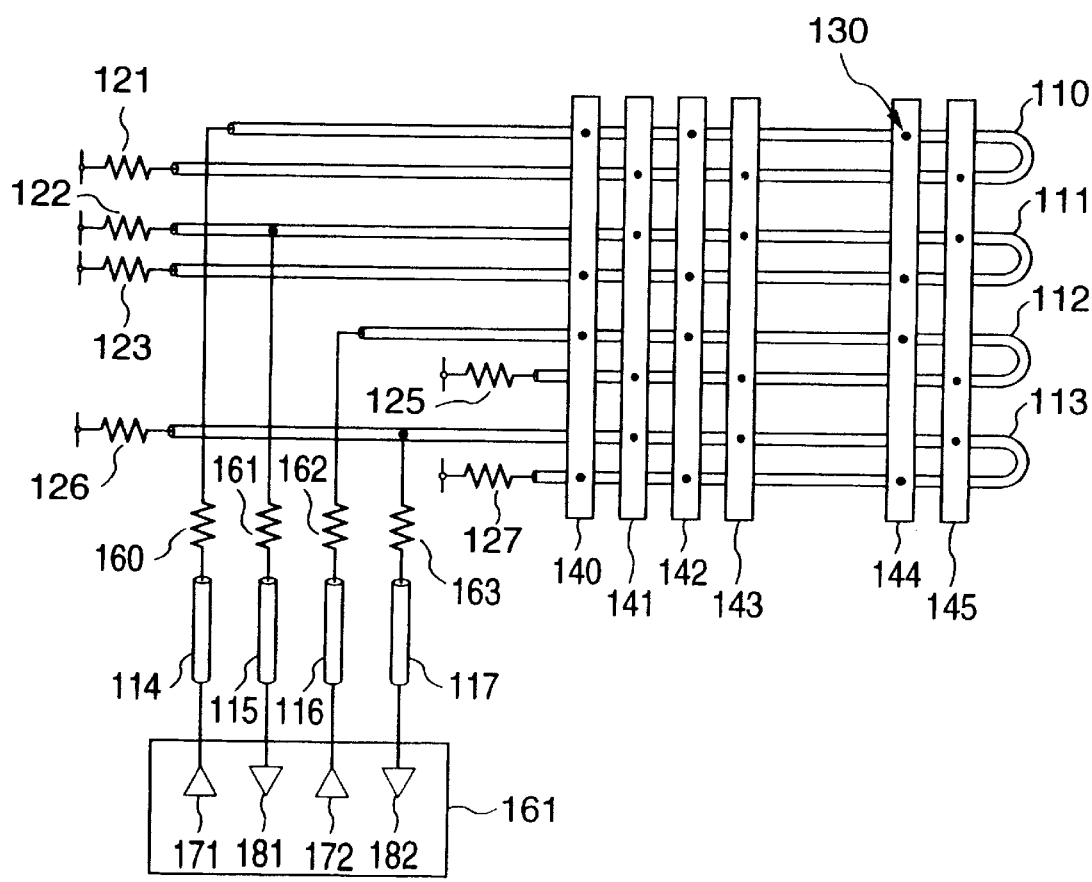
FIG. 47 shows a modification of the sixth embodiment of the invention, with the bus transmission lines terminated at one ends.
Figure 48:
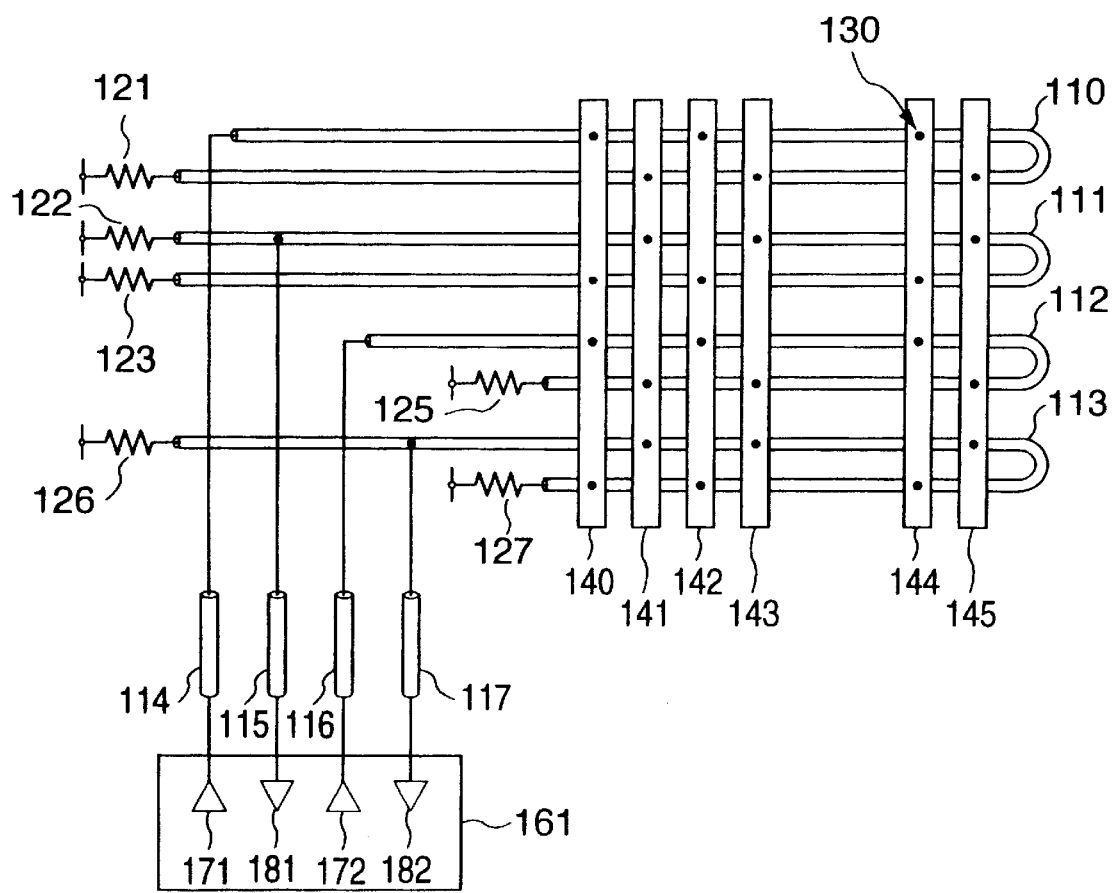
FIG. 48 shows another modification of the sixth embodiment of the invention.

Although both-end termination is shown in FIG. 46, one-end termination may be made for the signal propagating in one direction as on the transmission lines 110, 112 in FIG. 47. Thus, the number of mounted components can be reduced, and the consumption current can be decreased. In addition, when the lengths of the transmission lines 114–117 are short enough, for example, when the propagation times on these transmission lines are less than about ⅙ the rise time or fall time of the signal waveform, the resistors 150–153 can be eliminated. In this case, however, the signal amplitude on the b us 110 is large, and thus it is desirable to reduce the signal amplitude itself from the output circuit as shown in FIG. 48.

Moreover, this circuit arrangement can be applied to the small-amplitude circuit mentioned in JP-A-7-202947 filed by this applicant. In other words, the resistors 150–153 have the effect to suppress the reflection of signals from the branch points when the signals are propagated from branch transmission lines 114–117 to the main transmission line 110. The resistance values should be set to be the impedances of the branch transmission lines minus the impedance of the main transmission line. When the effective impedance of the main transmission line is lowered by the memory module mounted on the main transmission line, the resistance values are preferably selected to be smaller than the above values.

The standard resistance values are desirably fixed in the rang from about 0.5 time to 1.5 times the above values.

The seventh embodiment of the invention will be described. Like elements corresponding to those in the previous embodiments will not be described.

Figure 49:
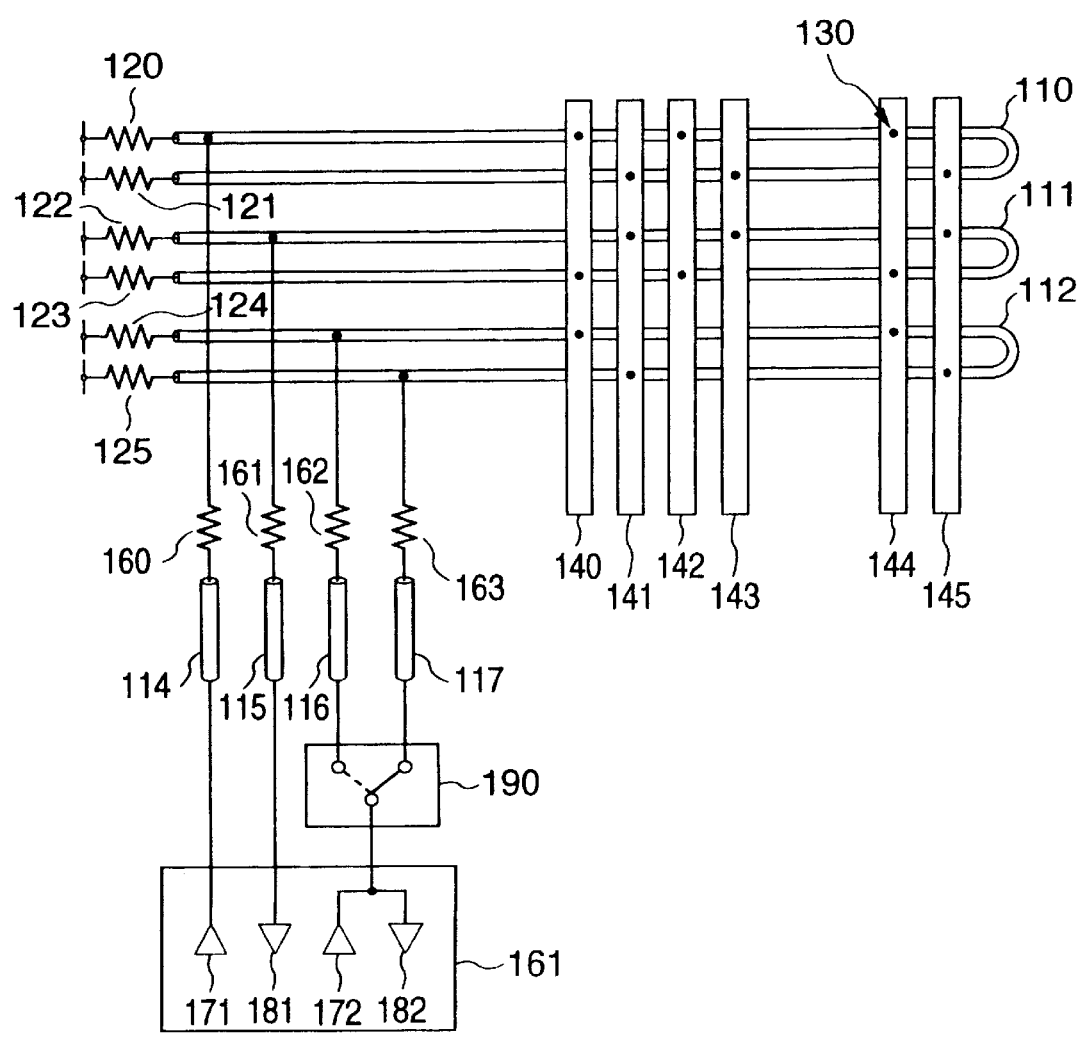
FIG. 49 shows the seventh embodiment of the invention.

Although in the sixth embodiment the input circuits and output circuits are separately provided in the memory controller 161 and memory module 162, FIG. 49 shows a modification of the seventh embodiment, in which input/output circuits are employed in the memory controller 161 and memory module 162. The input/output circuit is the circuit which has, for example, the output portion of the output circuit 172 and the input portion of the input circuit 182 connected within the circuit block 161 (for example, an integrated circuit) and has a single common terminal drawn out from the block.

In this case, a switch 190 is connected between the common terminal and the transmission lines 116, 117 so that the common terminal is connected to the transmission line 116 when data is written and to the transmission line 117 when data is read.

Figure 50:
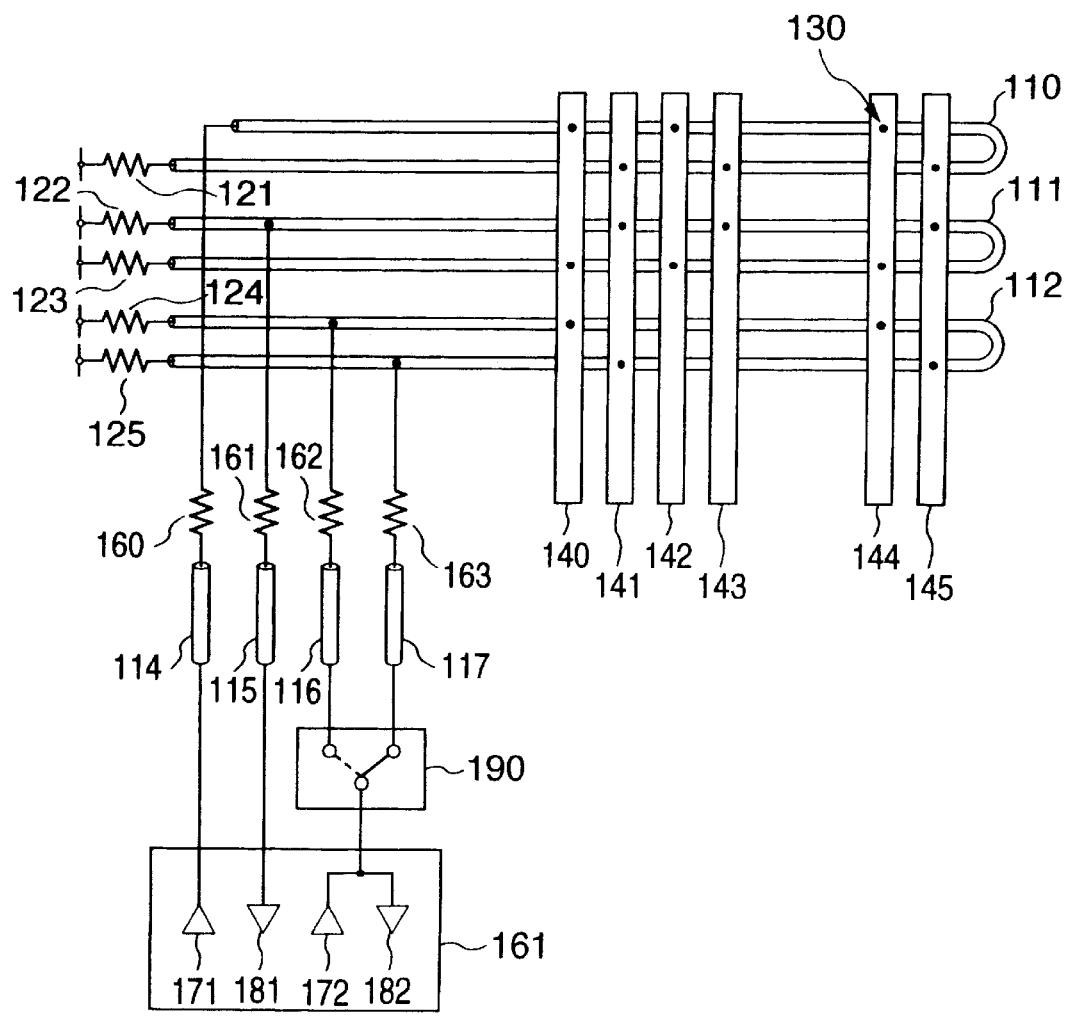
FIGS. 50 and 51 show modifications of the seventh embodiment.
Figure 51:
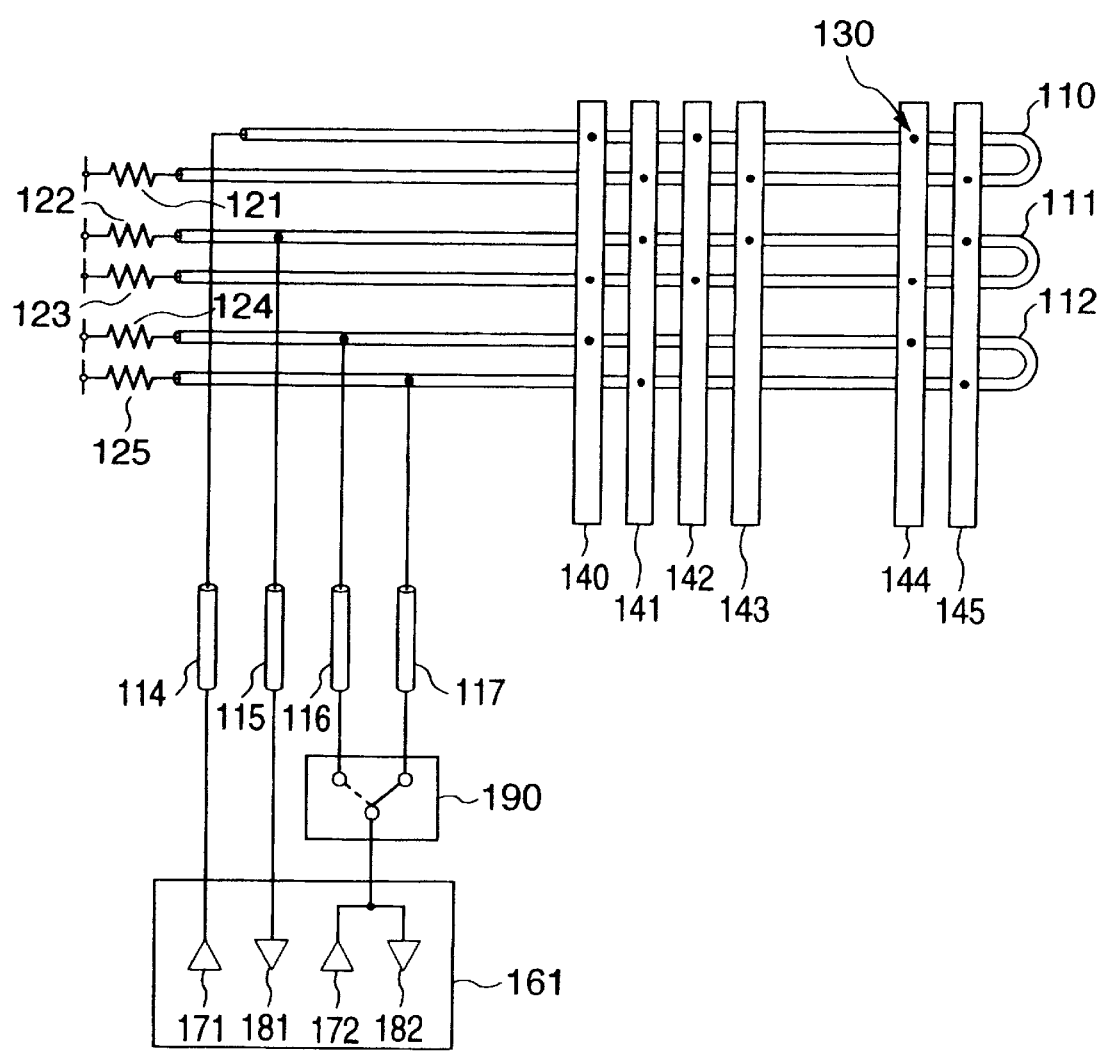

Thus, the system having the input/output circuit has the same effect as in the first embodiment. FIG. 50 shows another modification in which one-side termination is employed as in FIG. 47 but not as in FIG. 49, and FIG. 51 shows still another modification in which the insertion resistors are eliminated as in FIG. 48.

Figure 53:
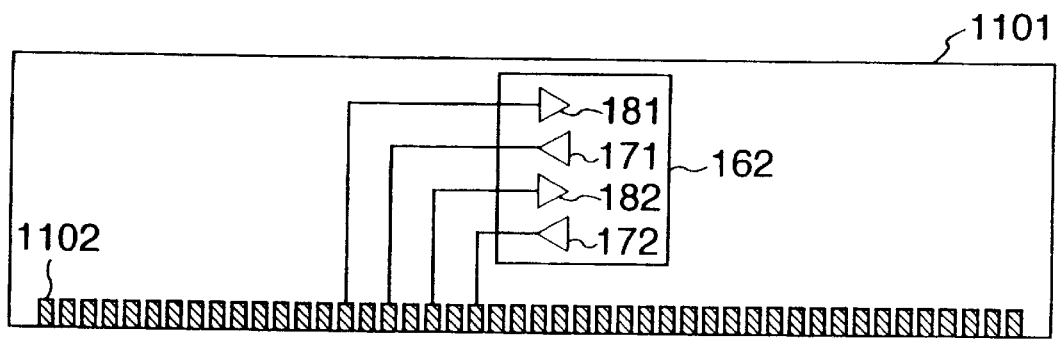
FIG. 53 shows an example of the memory module in the sixth embodiment.
Figure 54:
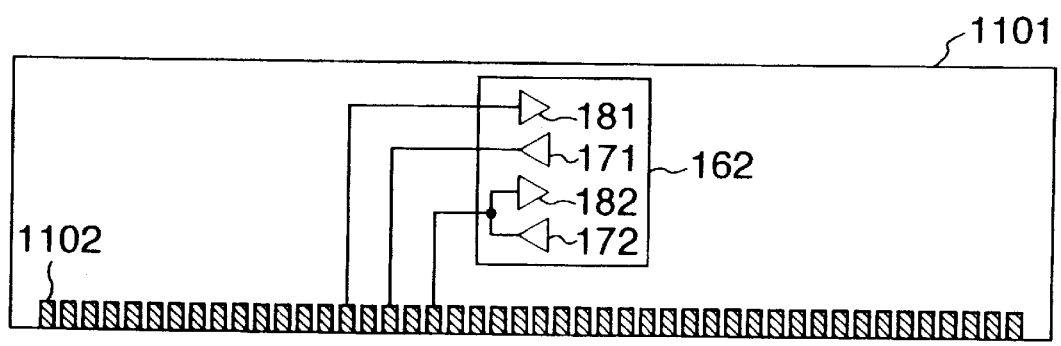
FIG. 54 shows an example of the memory module in the seventh embodiment.

FIGS. 53 and 54 show a memory chip within the memory module. The memory chip in FIG. 53 is used in the embodiment shown in FIG. 46, and has the input circuit 181 for clock input, the output circuit 171 for producing a trigger signal as a return clock, the output circuit 172 for producing read data, and the input circuit 182 for receiving writing data. The chip shown in FIG. 54 includes the input/output circuit for producing and receiving data.

The single input circuit 181 for receiving a clock is generally included in each chip. The clock received by this input circuit is used so that the writing data, control signal and address signal can be received at the clock.

Figure 52:
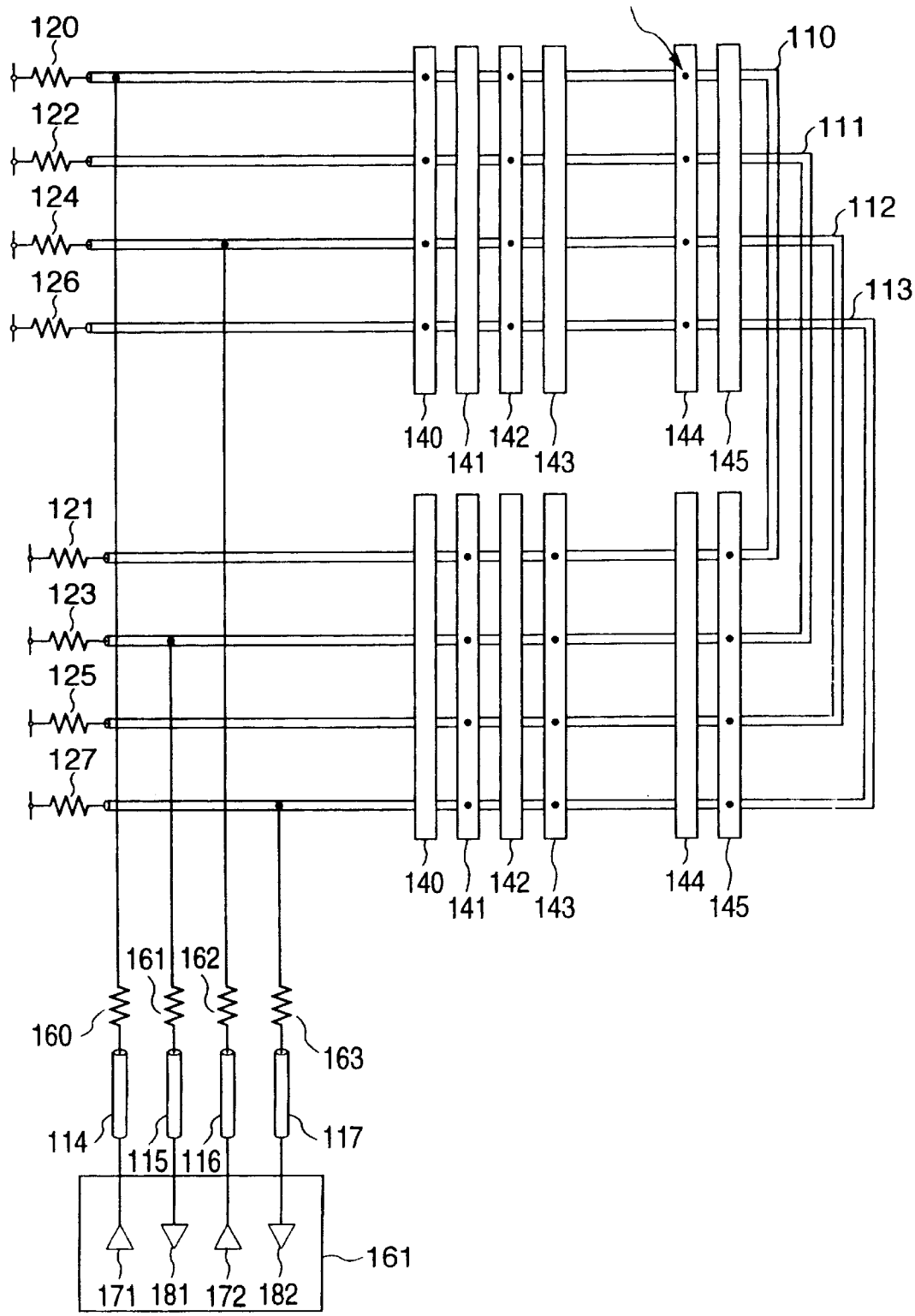
FIG. 52 shows the retiming circuit.

FIG. 52 shows another modification in which the "forward portion" and "backward portion" of each transmission line are respectively connected to different connectors. Thus, the "forward portion" and "backward portion" can be laid out in the same layer on the circuit board so that the number of layers can be reduced.

Figure 55:
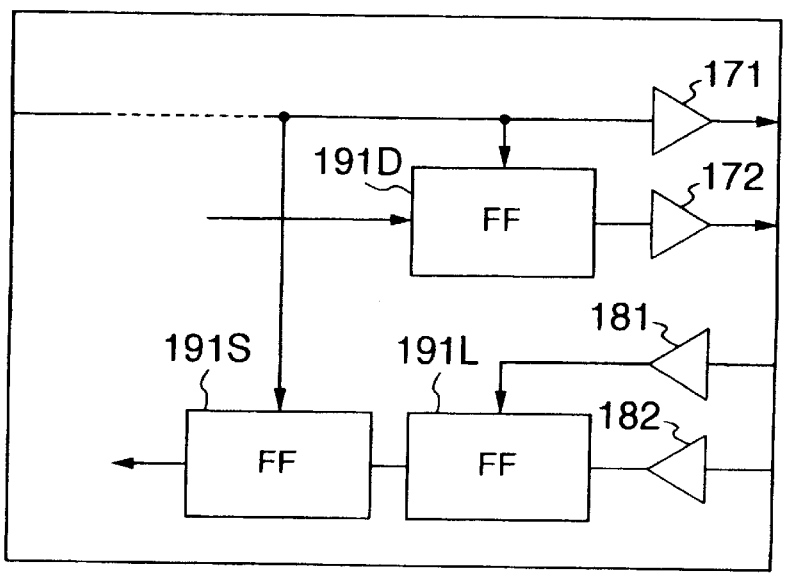
FIG. 55 is a diagram for the eighth embodiment of the invention.

FIG. 55 is a detailed block diagram of the output circuit and input circuit of the memory controller for the clock and data, according to the invention.

The flip-flops, 191D, 191S operate in synchronism with the internal clock, and the flip-flop 191L operates in synchronism with the trigger signal received by the input circuit 181 and produced from the memory.

Thus, the writing data from the memory controller is produced in synchronism with the clock within the chip. The read data from the memory is received with the setup and hold time kept assured by the trigger signal, and again adjusted in its timing (the phase being synchronized with the internal clock) by the internal clock in the following flip-flop.

Therefore, the transmission of signals from the memory controller to the process bus can be performed in synchronism with the internal clock's phase.

Although the flip-flop 191S used for the retiming is a single stage in this embodiment, a plurality of flip-flop stages may be employed. In this case, the phase of the clock fed to the flip-flop can be interposed between the phases of the internal clock and trigger signal. In addition, by using the multiplied internal clocks, it is possible to operate a plurality of flip-flop stages for the retiming.

The improvement in the clock transmission according to the invention will be described below. In the previous embodiments, the clock signal is transmitted under the same load as is the data signal. However, for the data transmission at, for example, 100 MHz, the clock period must be selected to be 10 ns (corresponding to 100 MHz), while the data period is 20 ns (corresponding to 50 MHz), or twice the period of the clock. Thus, a method of more stably transmitting the clock, according to the invention, will be mentioned.

The clock frequency (period) is first selected to be equal to that of data. Then, a multiplied-by-2 clock is generated from the input clock within the module or the memory LSI, and the SDRAM is controlled to receive and produce signals in synchronism with this generated clock.

The same function is provided in the memory controller.

In a double multiplying method, the duty ratio can be preferably stabilized at around 50% by once using a PLL to multiply by four, and then dividing by 2 to generate the double multiple clock. In general, the clock frequency is multiplied by 2(N+1), and divided by (N+1) where N is a natural number.

FIGS. 28 to 34 show the multiplying and dividing circuits.

Figure 28:
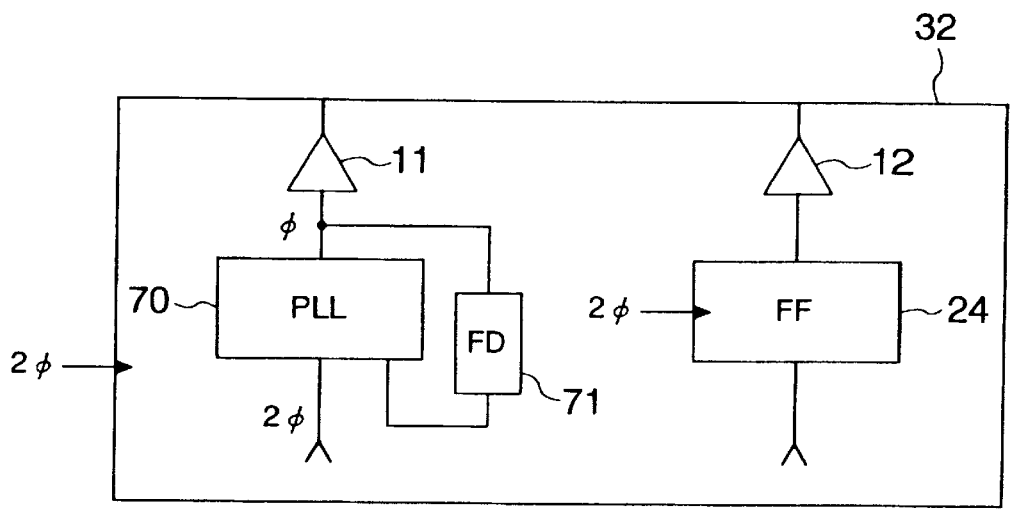
FIG. 28 shows the clock output circuit of a memory controller with a PLL circuit provided within the memory controller.

In FIG. 28, the clock $2\phi$ is processed by the PLL (Phase Locked Loop) 70 with the dividing circuit 71 to produce a clock of 0.5 time the frequency, or clock $\phi$. This clock is produced from the memory controller 32 through the output circuit 11. In addition, the data signal is produced from the output circuit 12 in synchronism with the original clock $2\phi$.

Figure 29:
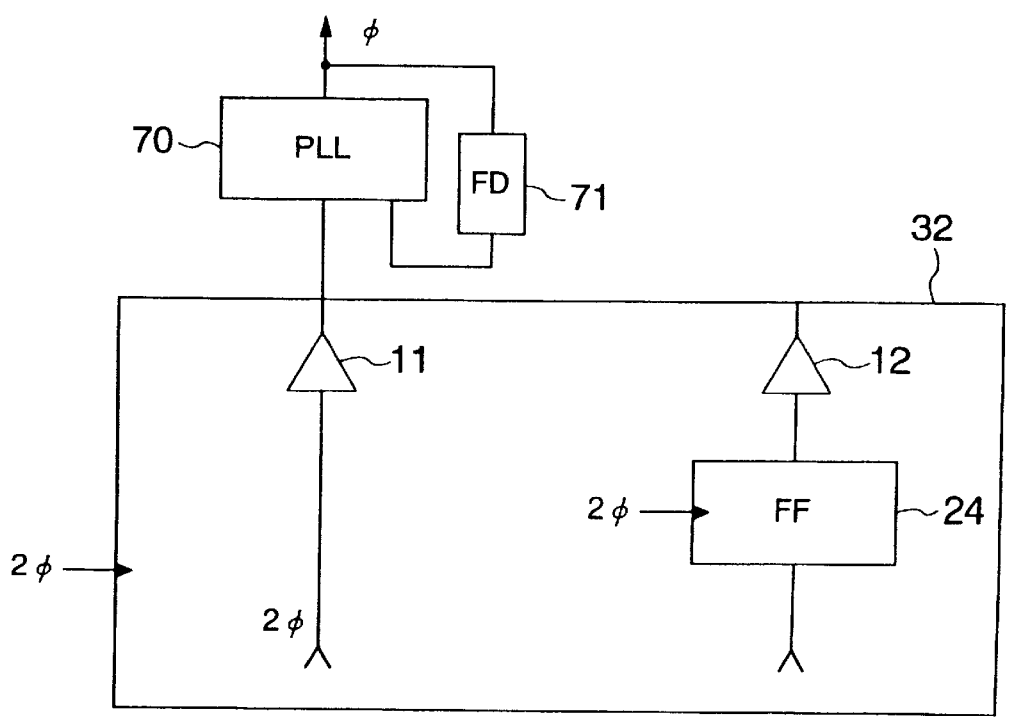
FIG. 29 shows the clock output circuit of the memory controller with the PLL circuit provided out of the memory controller.

In FIG. 29, the PLL 70 with diving circuit 71 is provided after the output circuit 11. Thus, the invention can be applied to the memory controller 32 having no PLL 70 with divider 71.

Figure 30:
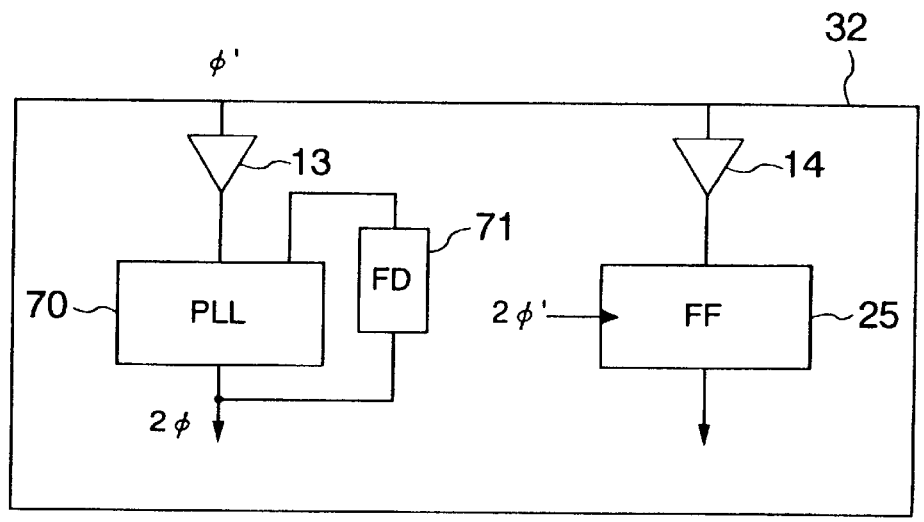
FIG. 30 shows the clock input circuit of the memory controller with the PLL circuit provided within the memory controller.

In FIG. 30, the clock $\phi'$ received by the receiving circuit 13 is multiplied in its frequency by the PLL 70 with dividing circuit 71 to produce a clock of twice the frequency, or the clock $2\phi'$. This clock $2\phi'$ is used so that the signal received by the receiving circuit 14 is latched by the flip-flop 25 at the clock. The clock $2\phi'$ used for the latching is different from the clock $2\phi$ within the memory controller. The frequency of clock $2\phi$ is equal to that of clock $2\phi'$, but the phase of clock $2\phi'$ is generally not equal to that of clock $2\phi$ since the clock $2\phi'$ is generated from the clock $\phi'$ that is produced from and again received by the memory controller.

Figure 31:
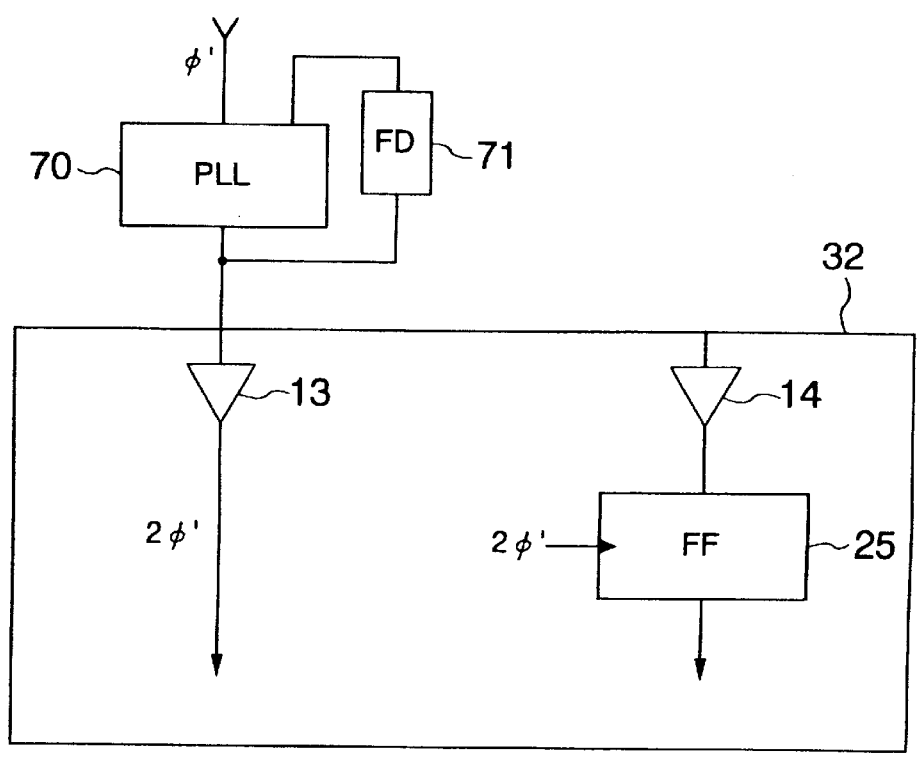
FIG. 31 shows the clock input circuit of the memory controller with the PLL circuit provided out of the memory controller.

In FIG. 31, the PLL 70 with dividing circuit 71 is provided before the receiving circuit 13. Thus, the invention can be applied to the memory controller having no PLL 70 with dividing circuit 71.

Figure 32:
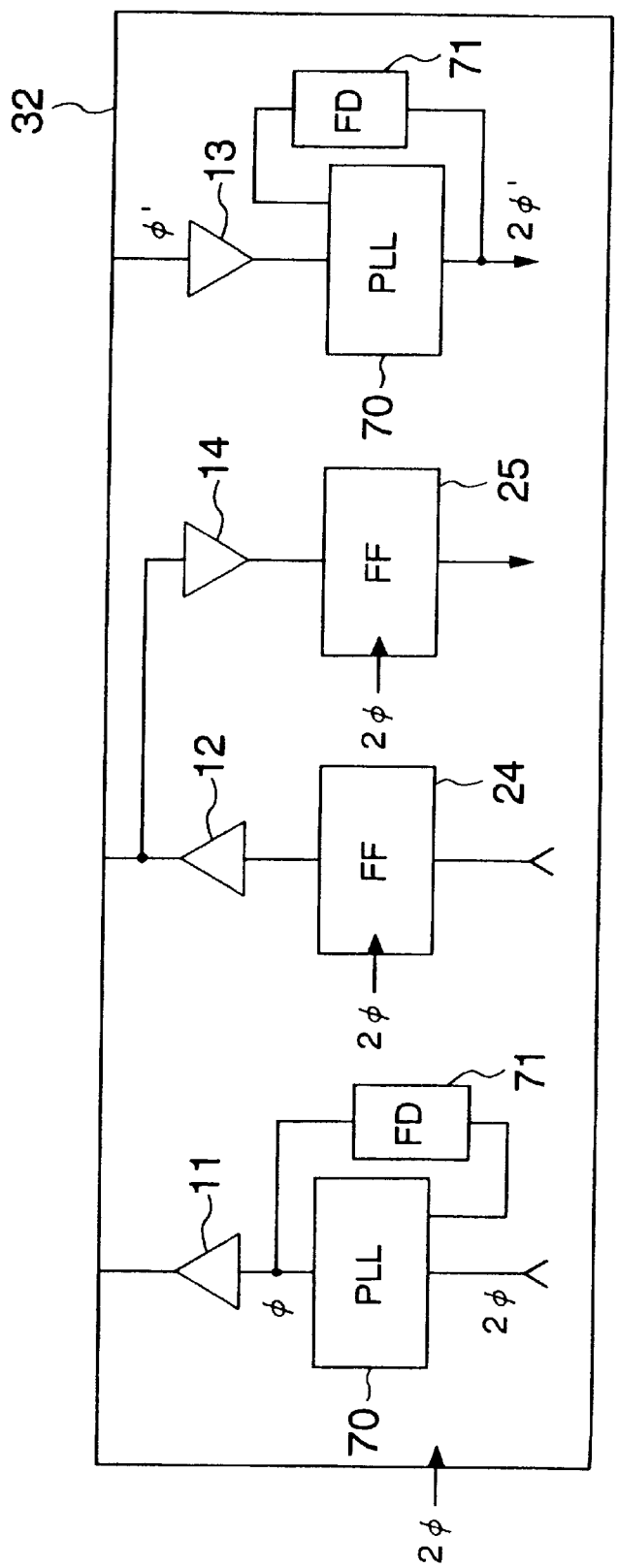
FIG. 32 shows the input/output common type memory controller with the PLL circuit provided within the memory controller.

In FIG. 32, the clock output circuit and input/output circuit are provided. The PLL 70 with dividing circuit 71 produces the clock $\phi$ of half the frequency of the internal clock $2\phi$. This clock is produced from the memory controller through the output circuit 11. The clock $\phi'$ fed back to the memory controller is received by the input circuit 13, and multiplied by 2 to produce the clock $2\phi'$ in the PLL 70 with dividing circuit 71. The data produced from the output circuit 12 is synchronized with the clock $2\phi$. The data received by the receiving circuit 14 is synchronized with the clock $2\phi$.

Figure 33:
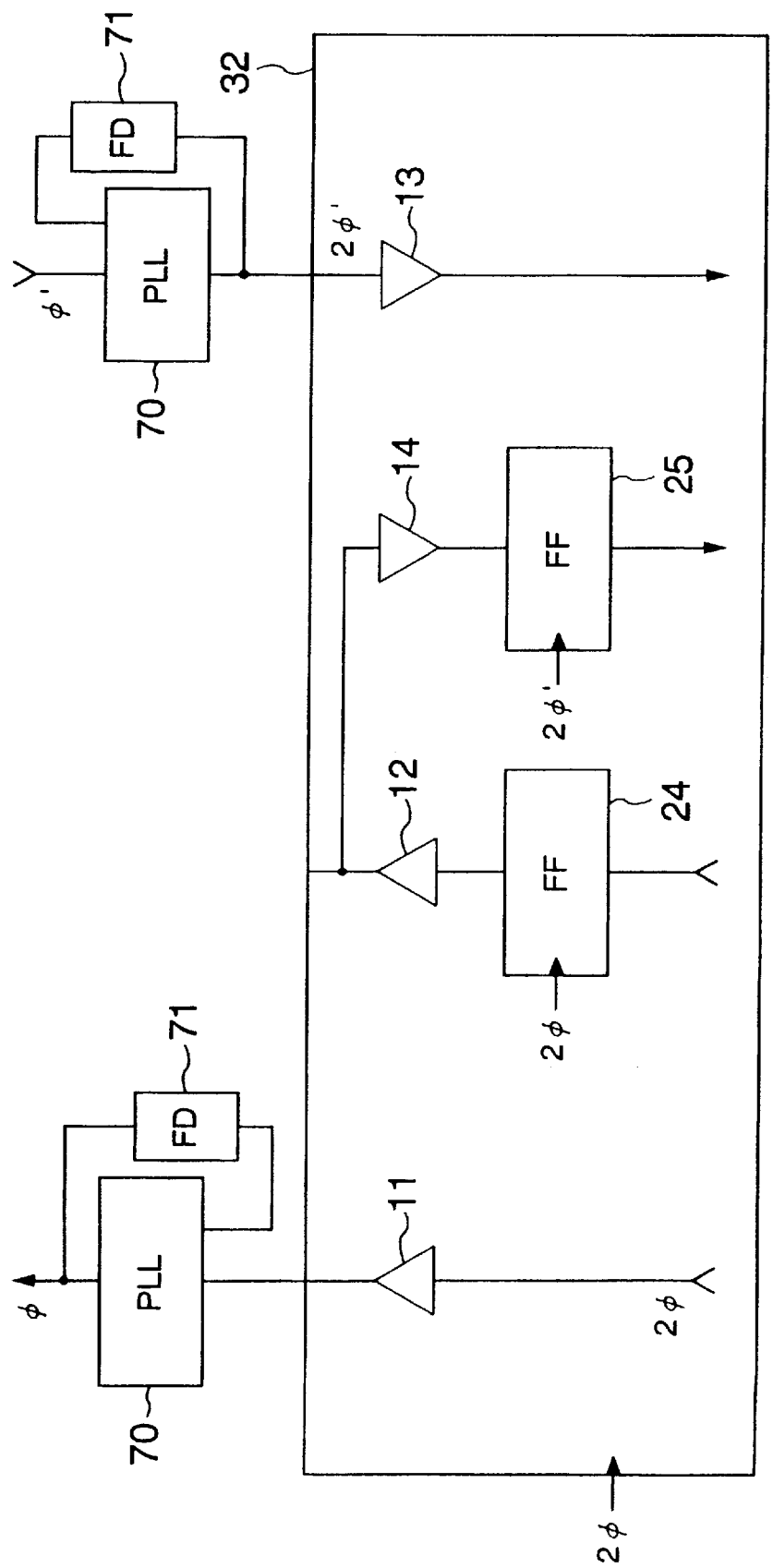
FIG. 33 shows the input/output common type memory controller with the PLL circuit provided out of the memory controller.

In FIG. 33, the PLL 70 with dividing circuit 71 is provided after the output circuit 11 and before the input circuit 13, similar to FIG. 31.

Figure 34:
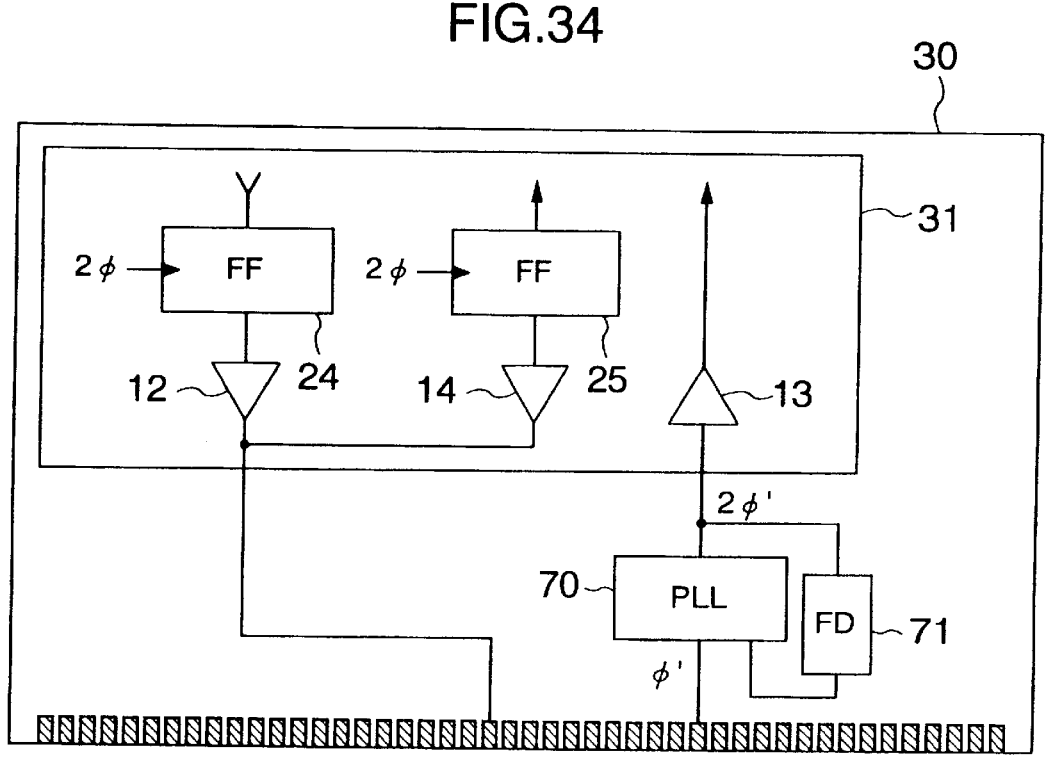
FIG. 34 shows the clock input in the memory module with the PLL circuit.

In FIG. 34, the PLL 70 with dividing circuit 71 is provided in the memory module. The clock $\phi'$ transmitted on the memory bus is fed to the PLL 70 with dividing circuit 71 and the clock $2\phi'$ is supplied to the clock pin of the synchronous-type memory 31, for example, SDRAM. The PLL 70 with dividing circuit 71 generates the clock $2\phi'$ of twice the frequency of the clock $\phi'$ that is fed from the memory controller.

Figure 38:
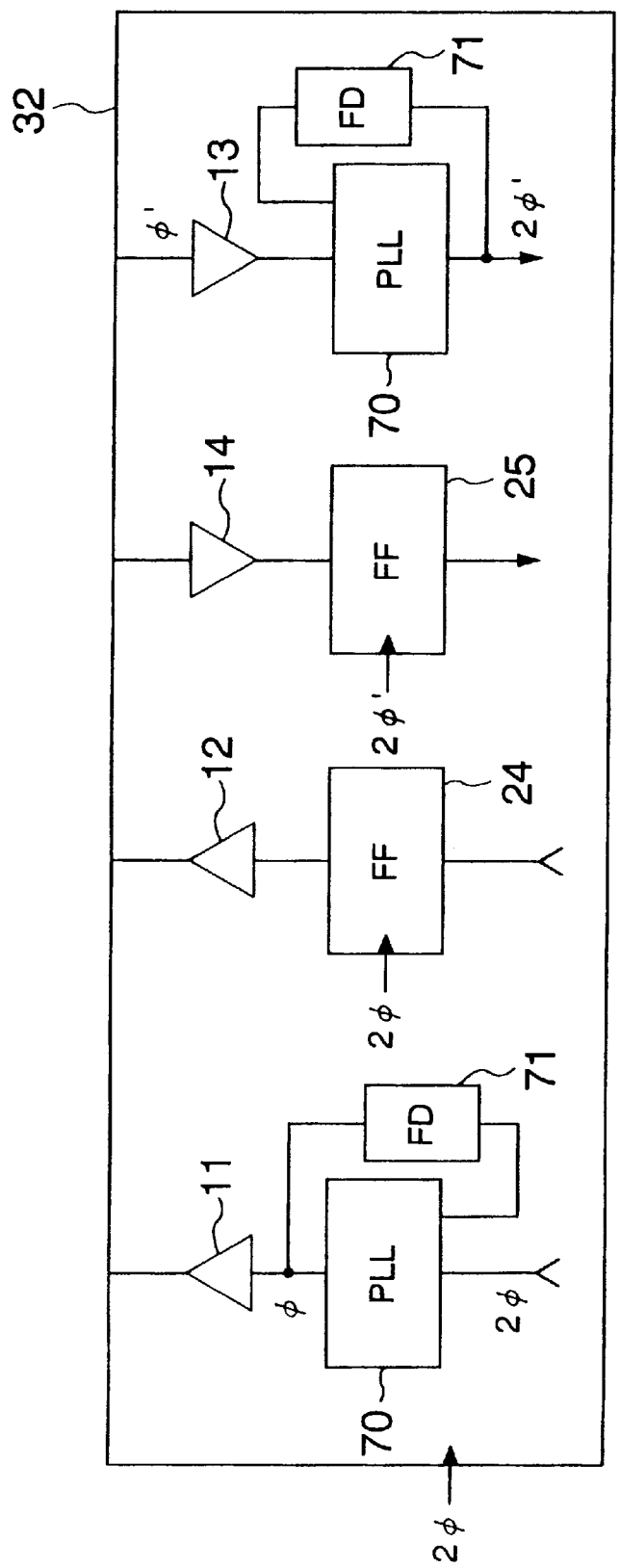
FIG. 38 shows the clock output circuit of the input-output separation type memory controller with the PLL circuit provided within the memory controller.
Figure 39:
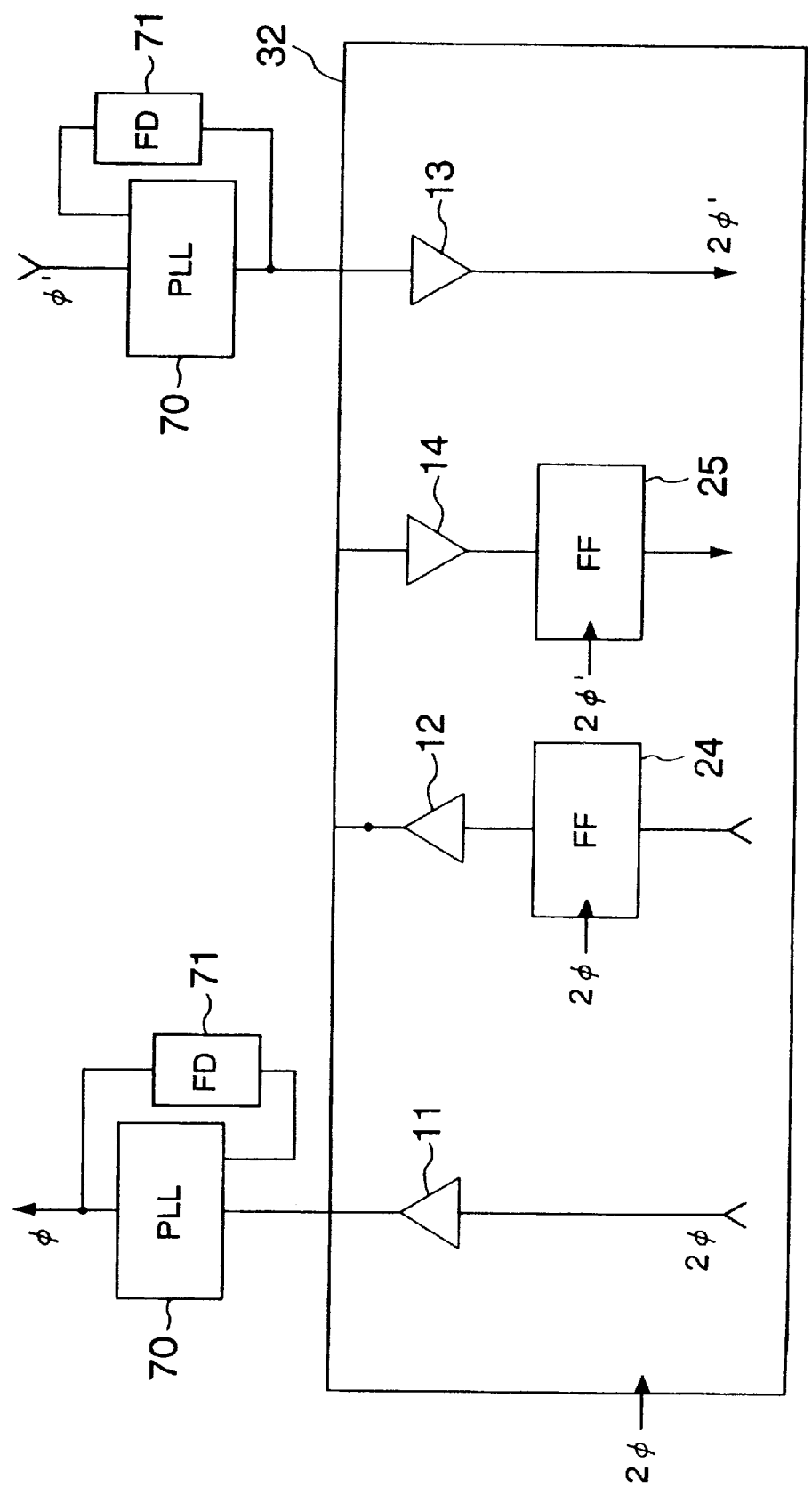
FIG. 39 shows the clock output circuit of the input-output separation type memory controller with the PLL circuit provided out of the memory controller.

While the memory controller includes the I/O circuit having both receiving circuit and output circuit as shown in FIGS. 32 and 33, the I/O separation type memory controller having the terminals for the respective receiving and output circuits can be used as shown in FIGS. 38 and 39. The difference between the arrangements of FIGS. 38 and 39 is similar to that between the arrangements of FIGS. 32 and 33. That is, the PLL is provided within or out of the memory controller.

Figure 40:
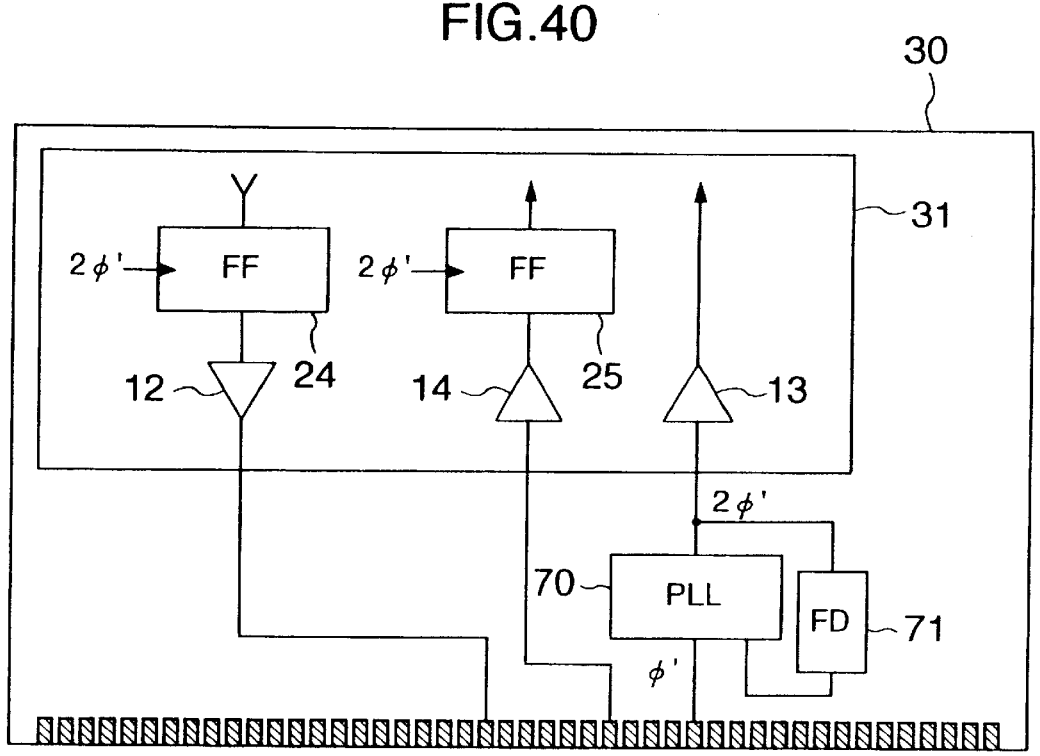
FIG. 40 shows the clock input in the memory module having the input-output separation type SDRAM circuit.

FIG. 40 shows an example of the I/O separation type memory module that is different from the I/O type memory module shown in FIG. 34.

Figure 42:
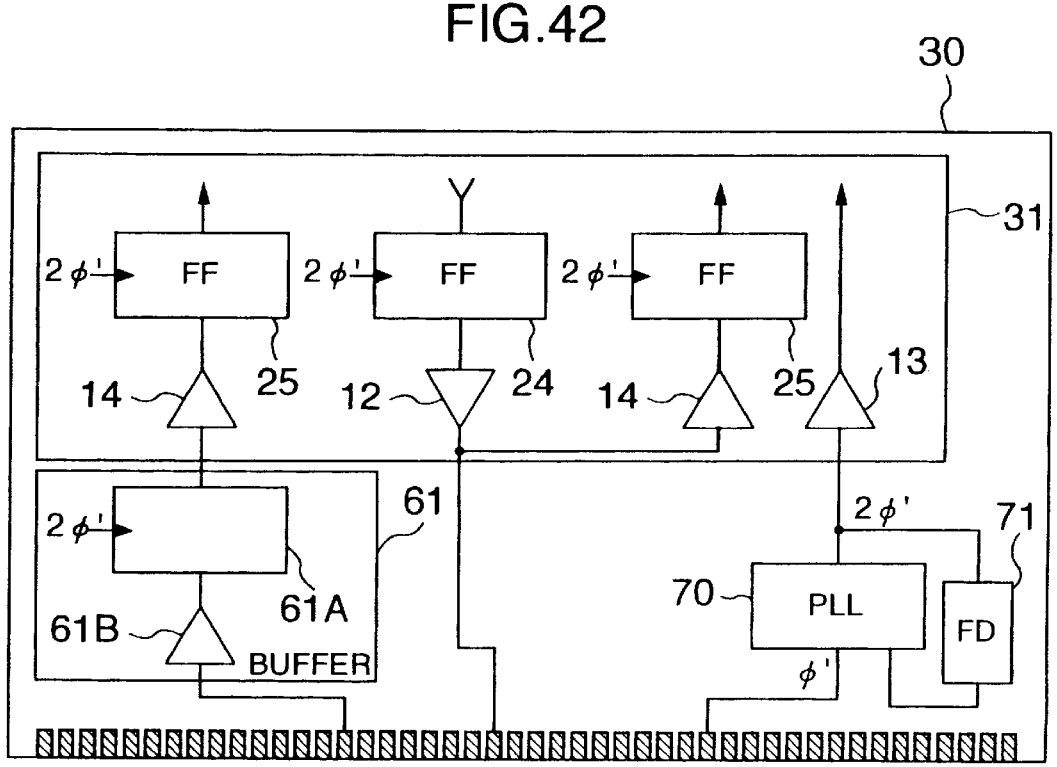
FIG. 42 shows the memory module having the register type buffer circuit and input/output common type SDRAM circuit.
Figure 43:
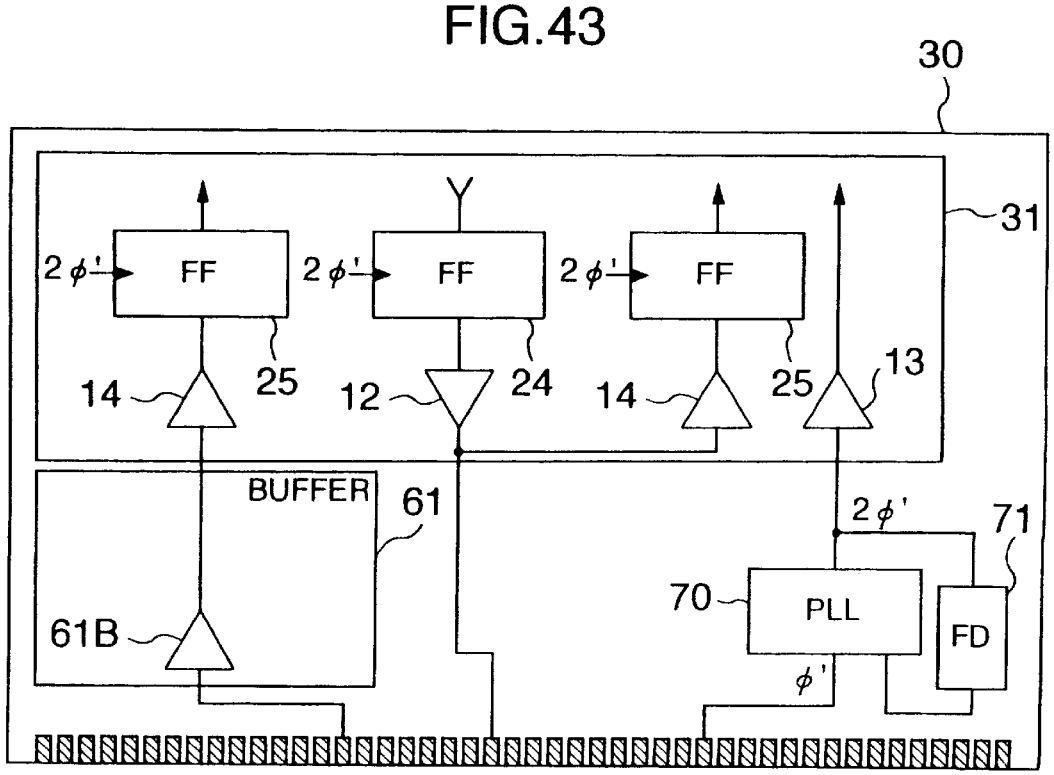
FIG. 43 shows the memory module having the through-type buffer circuit and input/output common type SDRAM circuit.

The present invention can be also applied to the memory module having a register-type buffer (FIG. 42), and to the memory module having a simple buffer (that is used as an intermediate buffer, having not latch function, and called through type or bus driver) (FIG. 43).

In addition, resistors may be inserted in the memory module of the embodiments of the invention. These resistors can make amplitude reduction and impedance matching and prevent reflection noise.

Figure 41:
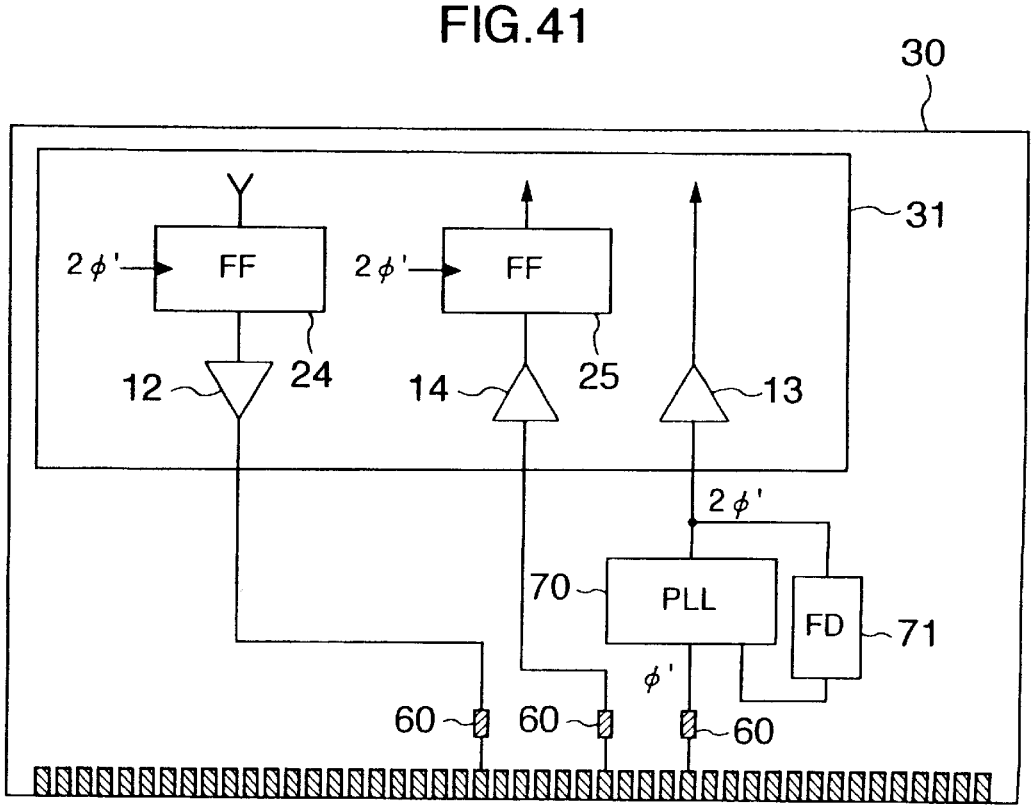
FIG. 41 shows the clock input in the memory module having the insertion resistors and input-output separation SDRAM circuit.
Figure 44:
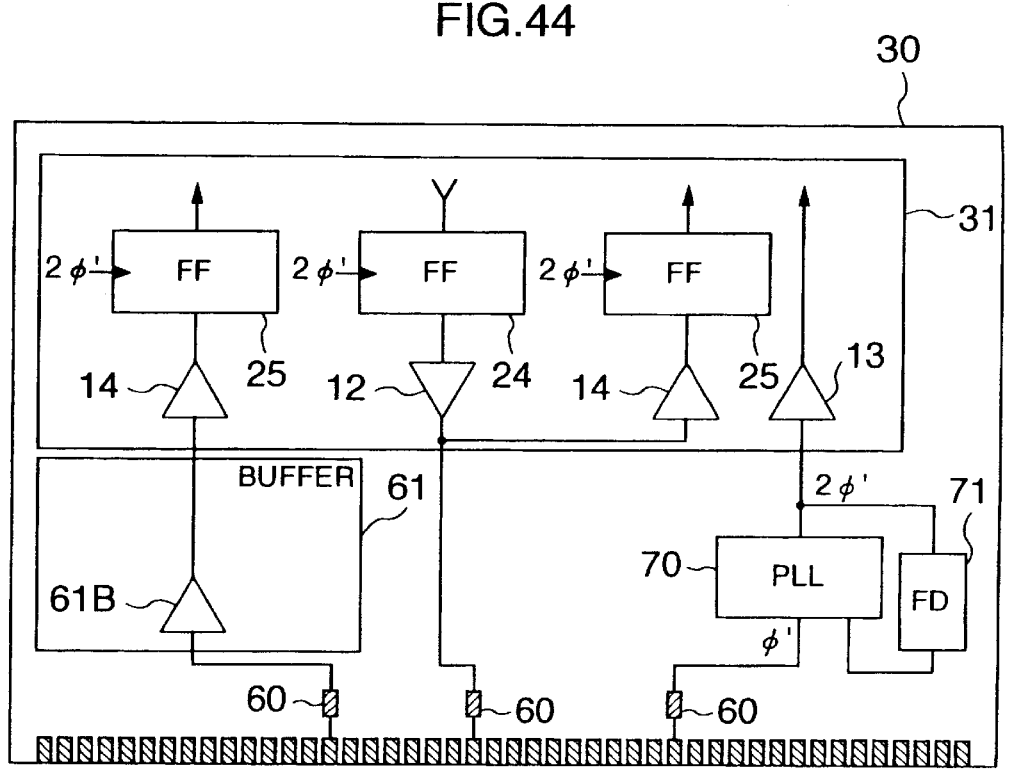
FIG. 44 shows the memory module having the insertion resistor, through-type buffer circuit and input/output common type SDRAM circuit.
Figure 45:
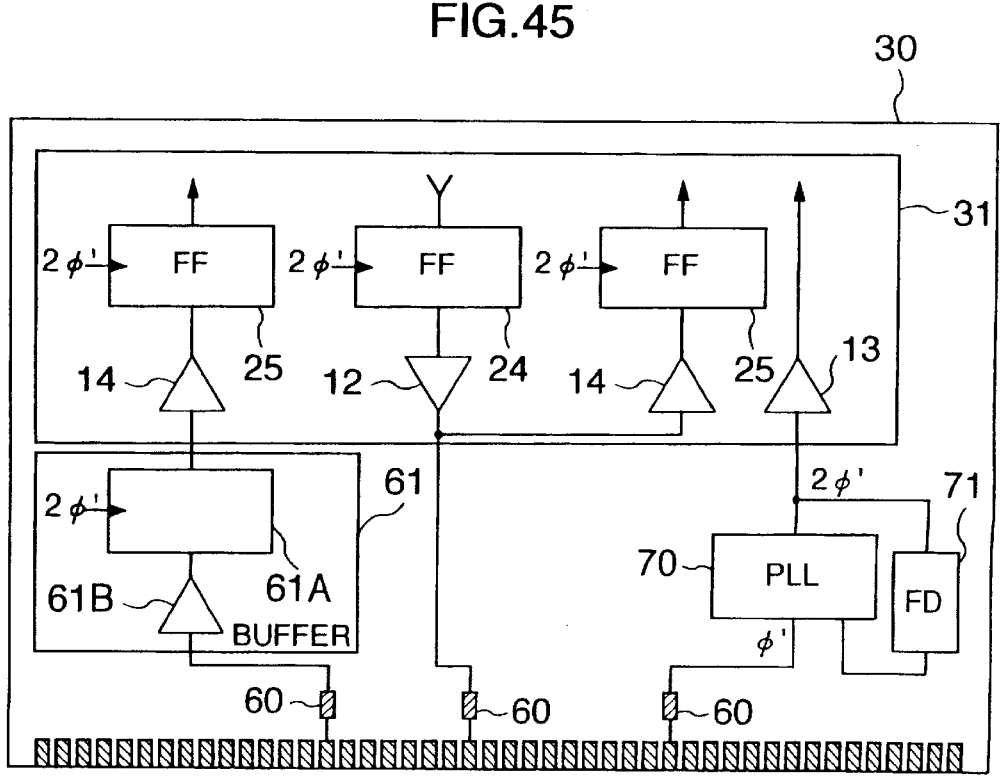
FIG. 45 shows the memory module having the insertion resistor, register type buffer circuit and input/output common type SDRAM circuit.

FIG. 41 is a modification of the arrangement of FIG. 40, with resistors added. FIGS. 44 and 45 are also respectively modifications of the arrangements of FIG. 42 and 43, with resistors added.

FIGS. 13 and 14 show the modules mounted on the mother board, according to the invention. In FIG. 13, the memory controller 32 is mounted directly on the mother board, and the memory modules 30 each of which has the memory ICs (SDRAMs) 31 mounted on the daughter board are mounted through the connectors on the mother board.

Figure 15:
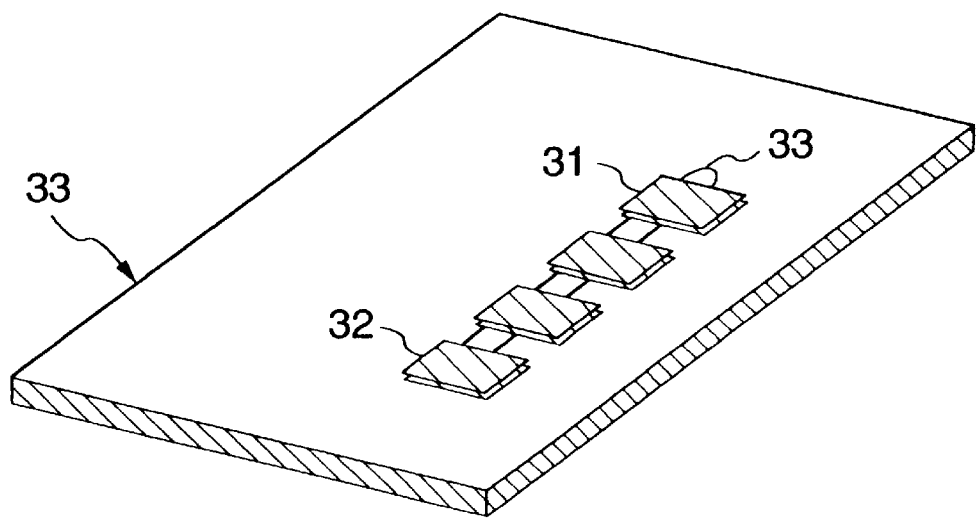
Figure 16:
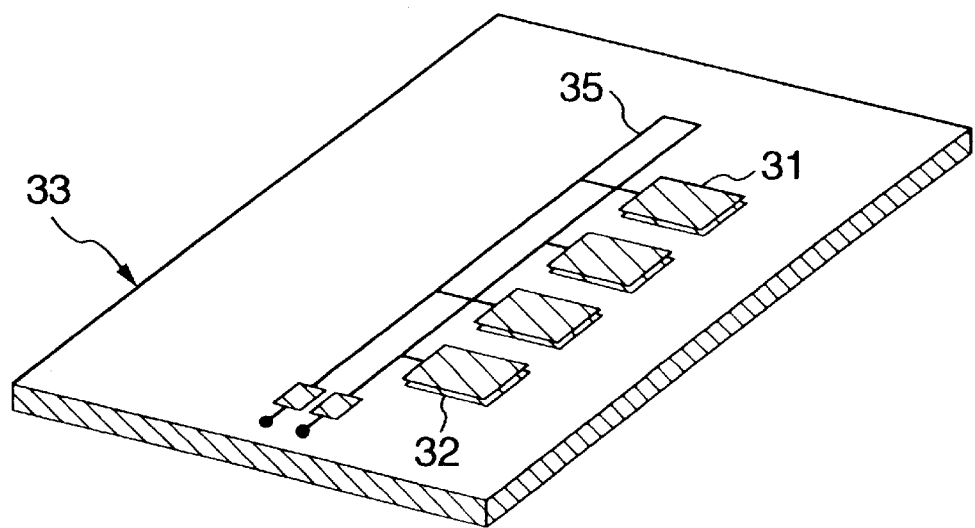

In FIG. 14, the memory controller 32 is mounted on the daughter board of each module. FIGS. 15 and 16 show the memory ICs 31 mounted directly on the mother board, not through the connectors.

Some of the above-mentioned embodiments are useful for the connection between the cache memory and the processor. The workstation and personal computer have various different buses such as processor bus, memory bus and peripheral bus as shown in FIG. 17. While the present invention is applied to the connection between the memory modules as described above, the present invention is not limited to the memory bus, but may be applied to other buses irrespective of the presence or absence of the connectors and modules. Moreover, the present invention can be applied to a multimodule which has a plurality of LSIs mounted within a package, not mounted on the board.

According to the invention, design for fast signal transmission can be achieved even in a memory system in which the signal propagation time is large and the delay time to each module is different depending on its position.

What is claimed is:

1. A signal transmission system comprising:
   a first circuit block having a first output circuit for outputting a first signal, a first receiving circuit for receiving the first signal;
   a first input/output block for outputting a second signal and receiving a third signal;
   a plurality of second circuit blocks each having a second receiving circuit for receiving the first signal, a third receiving circuit for receiving the second signal and a third output circuit for outputting the third signal;
   a first transmission line for transmitting the first signal, and a second transmission line for transmitting the second signal and the third signal, said first and second transmission lines being laid out from said first circuit block to the farthest second circuit block or more distant position, and returning to said first circuit block from forward and backward transmission line portions; and
   a switching circuit connected between said second transmission line and said first input/output circuit such that the second and third signals are transmitted in an identical direction on said second transmission line; and
   said first input/output circuit latching said third signal in synchronism with said first signal.

2. A signal transmission system comprising:
   a first circuit block comprising a first output circuit for producing a first signal, and a second output circuit for producing a second signal;
   a plurality of second circuit blocks each including a first receiving circuit for receiving said first signal, a second receiving circuit for receiving said second signal, wherein said first receiving circuit latches said first signal in synchronism with said second signal; and
   transmission lines connected between said first circuit block and said second circuit blocks, wherein said transmission lines include a first transmission line for propagating said first signal, and a second transmission line for propagating said second signal, said first and second transmission lines being laid out from the first circuit block to the farthest second circuit block or more distant position, and turned back therefrom to form forward and backward transmission line portions, some of said plurality of second circuit blocks are connected to the forward transmission line portions, and the remaining second circuit blocks being connected to the backward transmission line portions.

3. A signal transmission system according to claim 2, wherein said first and second transmission lines have termination resistors connected at one distal ends for impedance matching between transmission lines.

4. A signal transmission system according to claim 3, further comprising:
   a third transmission line provided between said first output circuit and said first transmission line, for transmitting said first signal;
   a fourth transmission line provided between said second output circuit and said second transmission line, for transmitting said second signal;
   a first resistor provided between said first transmission line and said third transmission line; and
   a second resistor provided between said second transmission line and said fourth transmission line.

5. A signal transmission system according to claim 4, wherein the resistance value of said first resistor is in the range from 0.5 times to twice the value resulting from subtracting a half of the impedance of said first transmission line from the impedance of said third transmission line, and the resistance value of said second resistor is in the range from 0.5 times to twice the value resulting from subtracting a half of the impedance of said second transmission line from the impedance of said fourth transmission line.

6. A signal transmission system comprising:
   a first circuit block including a first output circuit for producing a first signal and a first receiving circuit for receiving a second signal;
   a plurality of second circuit blocks each including a second receiving circuit for receiving said first signal and a second output circuit for producing said second signal; and
   transmission lines connected between said first circuit block and said second circuit blocks, wherein said first circuit block further includes a third output circuit for producing a third signal and a third receiving circuit for receiving said third signal,
   said first receiving circuit latches said second signal in synchronism with said third signal which said third receiving circuit receives,
   said second circuit blocks each further includes a fourth receiving circuit for receiving said third signal,
   said second receiving circuit latches said first signal in synchronism with said third signal which said fourth receiving circuit receives, and
   said second output circuit produces said second signal in synchronism with said third signal which said fourth receiving circuit receives.

7. A signal transmission system according to claim 6, wherein
   said transmission lines includes a first transmission line for propagating said first signal, a second transmission line for propagating said second signal, and a third transmission line for propagating said third signal,
   said first, second and third transmission lines are laid out from said first circuit block to the farthest second circuit block or more distant position, and turned back therefrom to form forward and backward transmission line portions, some of said plurality of second circuit blocks are connected to the forward transmission line portions of said first and third transmission lines, the remaining second circuit blocks being connected to the backward transmission line portions, said some of second circuit blocks connected to the forward transmission line portion of said first transmission line is also connected to the backward transmission line portion of said second transmission line, the remaining second circuit blocks being further connected to the forward transmission line portion of the second transmission line, and said third receiving circuit receives said third signal through said third transmission line.

8. A signal transmission system according to claim 7, wherein said first, second and third transmission lines have termination resistors connected.

9. A signal transmission system according to claim 8, further comprising:

a first branch transmission line provided between said first output circuit and said first transmission line, for transmitting said first signal;

a second branch transmission line provided between said second receiving circuit and said second transmission line, for transmitting said second signal;

a third branch transmission line provided between said third output circuit and said third transmission line, for transmitting said third signal;

a fourth branch transmission line provided between said third receiving circuit and said third transmission line, for transmitting said third signal; and a first resistance element provided between said first transmission line and said first branch transmission line, a second resistance element provided between said second transmission line and said second branch transmission line, a third resistance element provided between said third transmission line and said third branch transmission line, and a fourth resistance element provided between said third transmission line and said fourth branch transmission line.

10. A signal transmission system according to claim 9, wherein the resistance value of said first resistance element is in the range from 0.5 times to twice the value resulting from subtracting a half of the impedance of said first transmission line from the impedance of said first branch transmission line, the resistance value of said second resistance element is in the range from 0.5 times to twice the value resulting from subtracting a half of the impedance of said second transmission line from the impedance of said second branch transmission line, the resistance value of said third resistance element is in the range from 0.5 times to twice the value resulting from subtracting a half of the impedance of said third branch transmission line from the impedance of said third branch transmission line, and the resistance value of said fourth resistance element is in the range from 0.5 times to twice the value resulting from subtracting a half of the impedance of said third transmission line from the impedance of said fourth branch transmission line.

11. A signal transmission system comprising:

a first circuit block having a first transmitting and receiving circuit formed of a first transmitting circuit for producing a first data signal and a first receiving circuit for receiving a second data signal, second circuit blocks each having a second transmitting and receiving circuit formed of a second receiving circuit for receiving said first data signal and a second transmitting circuit for producing said second data signal, and transmission lines for connecting said first and second circuit blocks, wherein said first circuit block further includes a third transmitting and receiving circuit formed of a third transmitting circuit for producing a first clock signal and a third receiving circuit for receiving a second clock signal, and a fourth transmitting circuit for producing said second clock signal, said second circuit blocks each further includes a fourth receiving circuit for receiving said first clock signal and said second clock signal, and said second receiving circuit latches said first data signal in synchronism with said first clock signal, said second transmitting circuit produces said second data signal in synchronism with said second clock signal, and said first receiving circuit latches said second data signal in synchronism with said second clock signal.

12. A signal transmission system according to claim 11, wherein said transmission lines include a first transmission line for transmitting said first and second data signals between said first and second transmitting and receiving circuits, and a second transmission line for transmitting said first and second clock signals between said third and fourth transmitting and receiving circuits, said first and second transmission lines are laid out from said first circuit block to the farthest second circuit block or more distant position, and turned back therefrom to form forward and backward transmission line portions, and some of said second circuit blocks are connected to the forward portions of said first and second transmission lines, and the remaining second circuit blocks are connected to the backward portions of said first and second transmission lines.

13. A signal transmission system according to claim 12, wherein said first and second transmission lines have termination resistors connected at one distal ends for impedance matching between transmission lines.

14. A signal transmission system according to claim 13, further comprising:

a third transmission line provided between said first transmitting and receiving circuit and said first transmission line, for transmitting said first and second data signals;

a fourth transmission line provided between said third transmitting and receiving circuit and said second transmission line, for transmitting said first and second clock signals;

a fifth transmission line provided between said fourth transmitting circuit and said first transmission line, and a first resistance element provided between said first and third transmission lines, a second resistance element between said first and fourth transmission lines, and a third resistance element between said second and fifth transmission lines.

15. A signal transmission system according to claim 14, wherein the resistance value of said first resistance element is in the range from 0.5 times to twice the remainder of the subtraction of a half of the impedance of said first transmission line from the impedance of said third transmission line, the resistance value of said second resistance element is in the range from 0.5 times to twice the remainder of the subtraction of a half of the impedance of said second transmission line from the impedance of said fourth transmission line, and the resistance value of said third resistance element is in the range from 0.5 times to twice the remainder of the subtraction of a half of the impedance of said second transmission line from the impedance of said fifth transmission line.

16. A signal transmission system comprising:
a clock circuit for generating a clock signal;
a first integrated circuit having a first output circuit for receiving said clock signal and producing a first signal in synchronism with said clock signal;
a plurality of second integrated circuits each having a first receiving circuit for receiving said first signal in synchronism with said clock signal;
a first transmission line for transmitting said clock signal to said second integrated circuits;
a second transmission line for transmitting said first signal to said second integrated circuits; and
a circuit board for mounting thereon said clock circuit, and said first and second integrated circuits, wherein said plurality of second integrated circuits being arranged in a row on said circuit board and connected in series to said first transmission line;
and wherein said first transmission line is laid out from said clock circuit to the farthest second integrated circuit or more distant position, and turned back therefrom, extending to the nearest second integrated circuit to said clock circuit to form substantially parallel forward and backward transmission line, and some of said second integrated circuits are connected to the forward portion of said first transmission line, and the remaining second integrated circuits are connected to the backward portion of said first wiring transmission line.

17. A signal transmission system according to claim 16, wherein:
said second transmission line is laid from said first integrated circuit to the farthest second integrated circuit or more distant position, and turned back therefrom, extending to the nearest second integrated circuit to said first integrated circuit to form substantially parallel forward and backward transmission line portions, and
said second integrated circuits are connected to said second transmission line in the same way as said second integrated circuits are connected to said first transmission line.

18. A signal transmission system according to claim 17, wherein:
each of said second integrated circuits further includes a second output circuit for producing a second signal,
said first integrated circuit includes a second receiving circuit for receiving said second signal,
a third wiring conductor is provided for transmitting said second signal between said first integrated circuit and said second integrated circuits,
said first transmission line is connected to each of said second integrated circuits and then extends to said first integrated circuit,
said second integrated circuits produce said second signal in synchronism with said clock signal received through said first transmission line, and
said first integrated circuit receives said second signal in synchronism with said clock signal received through said first transmission line.

19. A signal transmission system comprising:
a clock circuit for generating a clock signal;
a clock distribution circuit for multiplying said clock signal by ½ and distributing said halved-frequency clock as a first signal;
a first circuit block that receives said clock signal and operates in synchronism with said clock signal, said first circuit block having a first output circuit for producing a second signal to the outside; and
second circuit blocks each having a second receiving circuit for receiving said second signal, a first receiving circuit for receiving said first signal, a multiplying circuit for producing a third signal resulting from doubling the frequency of said first signal received by said first receiving circuit, and a latch circuit for latching said second signal received by said second receiving circuit in synchronism with said third signal.

20. A signal transmission system comprising:
a first circuit block having a first output circuit for outputting a first signal, a first receiving circuit for receiving the first signal;
a first input/output block for outputting a second signal and receiving a third signal;
a plurality of second circuit blocks each having a second receiving circuit for receiving the first signal, a third receiving circuit for receiving the second signal and a third output circuit for outputting the third signal:
a first transmission line for transmitting the first signal, and a second transmission line for transmitting the second signal and the third signal, said first and second transmission lines being laid out from said first circuit block to the farthest second circuit block or more distant position, and returning to said first circuit block from forward and backward transmission line positions; some of said second circuit blocks being connected to said forward transmission line portions of said first and second transmission lines, and the remaining second circuit blocks being connected to the backward transmission line portions;
a switching circuit connected between said second transmission line and said first input/output circuit such that the second signal and the third signal are transmitted in an identical direction on said second transmission line; and
said first input/output circuit latching said third signal in synchronism with said first signal.

21. A signal transmission system according to claim 20, wherein said first transmission line or said second transmission line has a terminator connected at one end or both ends for impedance matching between the transmission lines.

22. A signal transmission system according to claim 21, further comprising:
a third transmission line provided between said first output circuit and said first transmission line, for transmitting said first signal;
a fourth transmission line provided between said switch circuit and said second transmission line, for transmitting said second signal; and
a fifth transmission line provided between said switch circuit and said second transmission line, for transmitting said third signal.

23. A signal transmission system according to claim 22, further comprising:
a first resistor provided between said first transmission line and said third transmission line, a second resistor provided between said first transmission line and said fourth transmission line, and a third resistor provided between said second transmission line and said fifth transmission line.

24. A signal transmission system according to claim 23, wherein the resistance value of said first resistor is in the range from 0.5 times to twice the remainder of the subtraction of a half of the impedance of said first transmission line from the impedance of said third transmission line, the resistance value of said second resistor is in the range from 0.5 times to twice the remainder of the subtraction of a half of the impedance of said first transmission line from the impedance of said fourth transmission line, and the resistance value of said third resistor is in the range from 0.5 times to twice the remainder of the subtraction of a half of the impedance of said second transmission line from the impedance of said fifth transmission line.

25. A signal transmission system according to claim 23, wherein said first input and output circuit receives said third signal in synchronism with a double-frequency signal resulting from doubling the first signal received by said first receiving circuit.

26. A signal transmission system according to claim 25, further comprising a phase adjust circuit provided to convert the phase of said third signal received by said first input and output circuit into a signal that can be controlled in synchronism with said first signal.

27. A signal transmission system comprising:

a first circuit block having a first output circuit for producing a first signal, a second output circuit for producing a second signal, a first receiving circuit for receiving a third signal, and a second receiving circuit for receiving a fourth signal;

a plurality of second circuit blocks each having a third receiving circuit for receiving said first signal, a fourth receiving circuit for receiving said second signal, a third output circuit for producing said third signal, and a fourth output circuit for producing said fourth signal; and first, second, third and fourth transmission lines for transmitting said first, second, third and fourth signals between said first circuit block and said second circuit blocks, wherein said first, second, third and fourth transmission lines are laid out from said first circuit block to the farthest second circuit block or more distant position, and turned back therefrom to form forward and backward transmission line portions, some of said second circuit blocks are connected to the forward portions of said transmission lines for said first and third signals, and the remaining second circuit blocks being connected to the backward transmission line portions therefor, said some of said second circuit blocks connected to the forward portion of said transmission line for said first signal are further connected to the backward transmission line portions for said second and fourth signals, the other second circuit blocks are connected to the forward transmission line portions for said second and fourth signals, and said second receiving circuit latches said fourth signal in synchronism with said third signal, and said fourth receiving circuit latches said fourth signal in synchronism with said first signal.

28. A signal transmission line comprising:

a first circuit block having a first output circuit for producing a first signal, a first receiving circuit for receiving a third signal, and a first input/output circuit for producing a second signal and receiving a fourth signal;

a plurality of second circuit blocks each having a second receiving circuit for receiving said first signal, a second output circuit for producing said third signal, and a second input/output circuit for receiving said second signal and producing said fourth signal; and a first transmission line for transmitting said first signal between said first circuit block and said second circuit blocks, a second transmission line for said second and said fourth signal, and a third transmission line said third signal, wherein said first, second and third transmission lines are laid out from said first circuit block to the farthest second circuit or more distant position, and turned back therefrom to form forward and backward transmission line portions, some of said second circuit blocks are connected to the forward transmission line portions for said first and second signals, and the remaining second circuit blocks are connected to the backward transmission line portions for said first and second signals, said some of said second circuit blocks connected to the forward transmission line portion for said first signal are further connected to the backward transmission line portion for said third signal, and the remaining second circuit blocks are connected to the forward transmission line portion for said third signal, and said second input/output circuit latches said second signal in synchronism with said first signal, and said first input/output circuit latches said fourth signal in synchronism with said third signal.

* * * * *